US009350133B2

(12) United States Patent
Wakabayashi et al.

(10) Patent No.: US 9,350,133 B2
(45) Date of Patent: May 24, 2016

(54) METHOD OF CONTROLLING LASER APPARATUS AND LASER APPARATUS

(71) Applicant: GIGAPHOTON INC., Oyama-shi, Tochigi (JP)

(72) Inventors: Osamu Wakabayashi, Oyama (JP); Hiroaki Tsushima, Oyama (JP); Kouji Kakizaki, Oyama (JP)

(73) Assignee: GIGAPHOTON INC., Tochigi (JP)

(*) Notice: Subject to any disclaimer, the term of this patent is extended or adjusted under 35 U.S.C. 154(b) by 0 days.

(21) Appl. No.: 14/579,698

(22) Filed: Dec. 22, 2014

(65) Prior Publication Data

US 2015/0188274 A1 Jul. 2, 2015

Related U.S. Application Data

(63) Continuation of application No. PCT/JP2013/067412, filed on Jun. 25, 2013.

(30) Foreign Application Priority Data

Jun. 26, 2012 (JP) .................................. 2012-143110

(51) Int. Cl.
*H01S 3/22* (2006.01)
*H01S 3/00* (2006.01)
(Continued)

(52) U.S. Cl.
CPC ............... *H01S 3/0014* (2013.01); *H01S 3/034* (2013.01); *H01S 3/036* (2013.01);
(Continued)

(58) Field of Classification Search
CPC ......... H01S 3/036; H01S 3/104; H01S 3/134; H01S 3/10069
See application file for complete search history.

(56) References Cited

U.S. PATENT DOCUMENTS 4,977,573 A 12/1990 Bittenson et al.
5,642,374 A 6/1997 Wakabayashi et al.
(Continued)

FOREIGN PATENT DOCUMENTS

JP 03135089 A 6/1991
JP 07335961 A 12/1995
(Continued)

OTHER PUBLICATIONS

International Search Report dated Sep. 17, 2013 corresponding to PCT/JP2013/067412.

*Primary Examiner* — Tod T Van Roy
(74) *Attorney, Agent, or Firm* — Studebaker & Brackett PC

(57) ABSTRACT

A method of controlling a laser apparatus may include: exchanging a gain medium in a chamber configured to output a laser beam by exciting the gain medium; first measuring, after the exchanging, pulse energy of a laser beam which is oscillated in the chamber under a specific gas pressure and a specific charge voltage; calculating an approximate expression indicating a relationship between the pulse energy of the laser beam and the gas pressure in the chamber and the charge voltage, or a table representing a correlationship between the pulse energy, the gas pressure and the charge voltage, based on the specific pressure, the specific charge voltage and the pulse energy in the first measuring; storing the approximate expression or the table; second measuring, after the first measuring, pulse energy Er of a laser beam oscillated in the chamber; calculating pulse energy Eec which is supposed to be obtained directly after the exchanging under the gas pressure and the charge voltage in the second measuring based on the approximate expression or the table; calculating a reduction amount ΔEd of pulse energy based on the pulse energy Eec and the pulse energy Er using ΔEd=Eec−Er; and calculating a partial gas exchange amount Q for partial gas exchange in the chamber based on the reduction amount ΔEd of pulse energy.

6 Claims, 14 Drawing Sheets

(51) Int. Cl.
*H01S 3/134* (2006.01)
*H01S 3/036* (2006.01)
*H01S 3/10* (2006.01)
*H01S 3/034* (2006.01)
*H01S 3/225* (2006.01)

(52) U.S. Cl.
CPC ............ *H01S 3/10069* (2013.01); *H01S 3/134* (2013.01); *H01S 3/2251* (2013.01); *H01S 3/2256* (2013.01); *H01S 3/225* (2013.01); *H01S 3/2258* (2013.01)

(56) References Cited

U.S. PATENT DOCUMENTS

| | | | |
|---|---|---|---|
| 6,151,349 | A | 11/2000 | Gong et al. |
| 6,212,214 | B1 | 4/2001 | Vogler et al. |
| 6,320,892 | B1 | 11/2001 | Padmabandu et al. |
| 6,330,267 | B1 | 12/2001 | Vogler et al. |
| 6,490,307 | B1 | 12/2002 | de Mos et al. |
| 7,372,887 | B2 | 5/2008 | Matsunaga et al. |
| 7,741,639 | B2 | 6/2010 | Besaucele et al. |
| 2002/0057724 | A1 | 5/2002 | Vogler et al. |
| 2002/0186741 | A1 | 12/2002 | Kleinschmidt et al. |
| 2006/0056478 | A1* | 3/2006 | Albrecht et al. ................. 372/55 |
| 2006/0239309 | A1* | 10/2006 | Ariga et al. ............... 372/29.021 |
| 2006/0239322 | A1 | 10/2006 | Matsunaga et al. |
| 2012/0006798 | A1* | 1/2012 | Eguchi .................... H01S 3/036 219/121.67 |

FOREIGN PATENT DOCUMENTS

| | | | |
|---|---|---|---|
| JP | 2000151002 | A | 5/2000 |
| JP | 2000294857 | A | 10/2000 |
| JP | 2001135882 | A | 5/2001 |
| JP | 2001242077 | A | 9/2001 |
| JP | 2001244532 | A | 9/2001 |
| JP | 2006303174 | A | 11/2006 |
| JP | 4650881 | B2 | 12/2010 |

\* cited by examiner

METHOD OF CONTROLLING LASER APPARATUS AND LASER APPARATUS

CROSS-REFERENCE TO RELATED APPLICATION

This application is a continuation of PCT International Application No. PCT/JP2013/067412 filed on Jun. 25, 2013 which claims the benefit of priority from Japanese Patent Application No. 2012-143110, filed on Jun. 26, 2012; the entire contents of which are incorporated herein by reference.

BACKGROUND

1. Technical Field

The present disclosure relates to a method of controlling a laser apparatus and a laser apparatus.

2. Related Art

In recent years, for a semiconductor exposure apparatus (hereinafter referred to as an exposure apparatus), a higher resolution is being required as miniaturization and integration of a semiconductor integrated circuit have been progressed. Therefore, wavelength-shortening of light outputted from an exposure light source has been developed. Generally, as an exposure light source, a gas laser apparatus is used instead of the traditional mercury lamp. For example, as a gas laser apparatus for exposure, a KrF excimer laser outputting an ultraviolet laser beam with 248 nm (nanometer) wavelength or an ArF excimer laser outputting an ultraviolet light beam with 193 nm wavelength may be used.

In a next generation exposure technology, an immersion exposure in which a gap between an exposure lens in an exposure apparatus and a wafer is filled with fluid has been put to practical use. In the immersion exposure, because refraction index between the exposure lens and the wafer is changed, an apparent wavelength of the exposure light source is shortened. In a case where an immersion exposure is conducted using an ArF excimer laser as an exposure light source, a wafer is irradiated with an ultraviolet light beam of which wavelength is equivalent to 134 nm. Such technique may be called as an ArF immersion exposure (or an ArF immersion lithography).

Natural oscillation amplitudes of a KrF excimer laser and an ArF excimer laser are wide such as about 350 to 400 pm (picometer). Therefore, when a projector lens is made of a material which transmits an ultraviolet light beam such as a KrF laser beam or an ArF laser beam, a chromatic distortion may occur. As a result, a resolution may be reduced. Therefore, a spectrum line width of a laser beam outputted from a gas laser apparatus should be narrowed to the extent a chromatic distortion can be ignored. In order to narrow a spectrum line width, in a laser resonator of a gas laser apparatus, a line narrow module (LNM) with a line narrowing element (an etalon, a grating, or the like) may be mounted. In the following, a laser apparatus of which a spectrum line width is narrowed may be called as a line narrowed laser apparatus.

SUMMARY

A method of controlling a laser apparatus according to an aspect of the present disclosure may include: exchanging a laser gain medium in a laser chamber configured to output a laser beam by exciting the laser gain medium; first measuring, after the exchanging, pulse energy of a laser beam which is oscillated in the laser chamber under a specific gas pressure and a specific charge voltage; calculating an approximate expression indicating a relationship between the pulse energy of the laser beam and the gas pressure in the laser chamber and the charge voltage, or a table representing a correlationship between the pulse energy, the gas pressure and the charge voltage, based on the specific pressure, the specific charge voltage and the pulse energy in the first measuring; storing the approximate expression or the table; second measuring, after the first measuring, pulse energy Er of a laser beam oscillated in the laser chamber; calculating pulse energy Eec which is supposed to be obtained directly after the exchanging under the gas pressure and the charge voltage in the second measuring based on the approximate expression or the table; calculating a reduction amount $\Delta Ed$ of pulse energy based on the pulse energy Eec and the pulse energy Er using $\Delta Ed=Eec-Er$; and calculating a partial gas exchange amount Q for partial gas exchange in the laser chamber based on the reduction amount $\Delta Ed$ of pulse energy.

A method of controlling a laser apparatus according to another aspect of the present disclosure may include: exchanging a laser gain medium in a laser chamber configured to output a laser beam by exciting the laser gain medium; first measuring, after the exchanging, pulse energy of a laser beam which is oscillated in the laser chamber under a specific gas pressure and a specific charge voltage; calculating an approximate expression indicating a relationship between the pulse energy of the laser beam and the gas pressure in the laser chamber and the charge voltage, or a table representing a correlationship between the pulse energy, the gas pressure and the charge voltage, based on the specific pressure, the specific charge voltage and the pulse energy in the first measuring; storing the approximate expression or the table; second measuring, after the first measuring, pulse energy Er of a laser beam oscillated in the laser chamber; calculating pulse energy Eec which is supposed to be obtained directly after the exchanging under the gas pressure and the charge voltage in the second measuring based on the approximate expression or the table; calculating a reduction amount $\Delta Ed$ of pulse energy based on the pulse energy Eec and the pulse energy Er using $\Delta Ed=Eec-Er$; and conducting, when the reduction amount $\Delta Ed$ of pulse energy is equal to or greater than a reference of an energy reduction amount, partial gas exchange of the laser gas in the laser chamber.

A laser apparatus according to yet another aspect of the present disclosure may comprise: a laser chamber configured to store a laser gain medium and output a laser beam by exciting the laser gain medium; a charger configured to apply a charge voltage for generating discharge in the laser chamber; and a storage configured to store an approximate expression indicating a relationship between a gas pressure in the laser chamber and the charge voltage and pulse energy of the laser beam oscillated under conditions of the gas pressure and the charge voltage, or a table representing a correlationship between the gas pressure, the charge voltage and the pulse energy.

BRIEF DESCRIPTION OF THE DRAWINGS

Hereinafter, selected embodiments of the present disclosure will be described with reference to the accompanying drawings.

DETAILED DESCRIPTION

Figure 1:
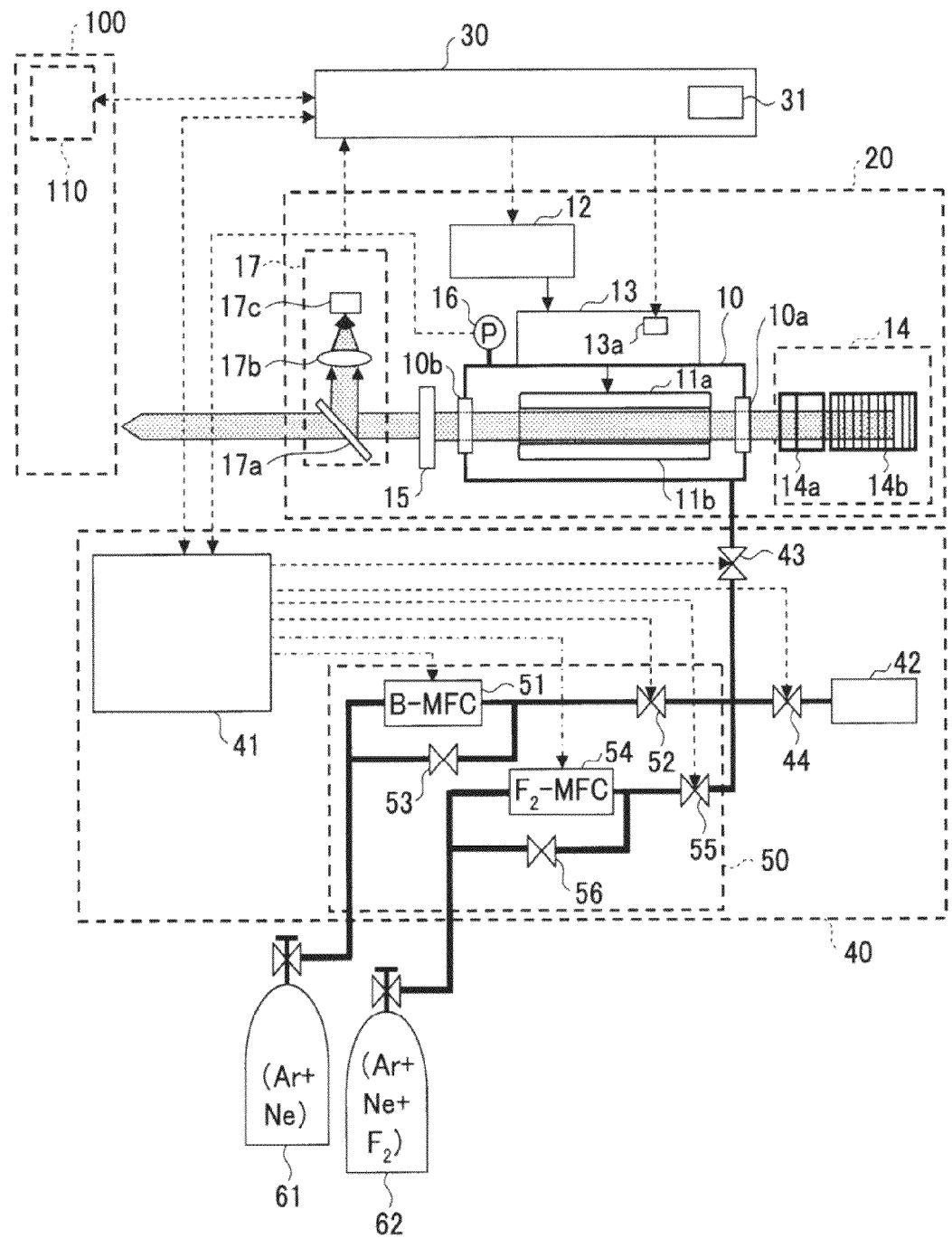
FIG. 1 is a configuration diagram of a laser apparatus according to the disclosure.

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein. The embodiments of the present disclosure will be described following the table of contents below.

Contents
1. Excimer laser apparatus
1.1 Configuration
1.2 Operation
1.3 Relationship between amount of impurity gas and laser power
2. Control flow of impurity gas in first embodiment
3. Control flow of impurity gas in second embodiment
4. Control flow of impurity gas in third embodiment 1. Excimer Laser Apparatus Generally, a discharge excited gas laser apparatus for a semiconductor exposure apparatus, which is an excimer laser apparatus, is required to output desired pulse laser beams stably for a long period of time.

However, when the excimer laser apparatus oscillates for a long period of time, impurities are generated in laser gas being laser gain medium, which may lead to cases where laser beams are absorbed, a discharge condition is decayed, and so forth. Accordingly, in such cases, it is impossible to output a pulse laser beam with a desired energy.

Therefore, a measurement of an impurity gas concentration included in laser gas is required. However, from the aspects that fluorine is very activus, and of accuracy of measurement, and so forth, a device capable of directly measuring an impurity gas concentration in laser gas including fluorine can be a costly and large measurement device such as a mass spectroscope, FTIR (fourier transform infrared spectroscopy) device, or the like. Therefore, it is difficult to install such measurement device in a laser apparatus.

1.1 Configuration

FIG. 1 shows an excimer laser apparatus being one aspect of the disclosure. An excimer laser apparatus may be simply referred to as a laser apparatus in the specification. An excimer laser apparatus may include a laser oscillation system 20, a laser controller 30 and a gas control system 40. The excimer laser apparatus may be connected to an exposure apparatus 100 with an exposure apparatus controller 110 for controlling the exposure apparatus 100, or the like.

The laser oscillation system 20 may include a laser chamber 10, a charger 12, a laser resonator, an energy monitor unit 17, and so forth. The laser resonator may include an output coupler (OC) 15 and a line narrow module (LNM) 14. The laser controller 30 may have a storage 31. The storage 31 may be a semiconductor memory or a magnetic storage medium, and may store information about a charge voltage, a total gas pressure, a pulse energy, and so forth.

The laser chamber 10 may include a pair of discharge electrodes 11a and 11b, and two windows 10a and 10b which transmit light in the laser resonator. The laser oscillator system 20 may include a pulse power module (PPM) 13 including a switch 13a, and a pressure sensor 16 for measuring a total gas pressure of laser gas. The charger 12 and the pulse power module 13 may cause the discharge electrode 11a and the discharge electrode 11b to generate pulse discharge therebetween.

The laser chamber 10 may be arranged on a light path of the laser resonator.

The line narrow model 14 may include a prism 14a for expanding a beam and a grating 14b. The prism 14a may include one or more prisms. An arrangement of the grating 14b may be a Littrow arrangement in which an incident angle and a diffraction angle become the same. The output coupler 15 may be a partial reflector mirror which reflects a part of a laser beam and transmits a part of the laser beam. The output coupler 15 and the grating 14b may construct the laser resonator.

The energy monitor unit 17 may monitor energy of a laser beam outputted through the output coupler 15 from the laser chamber 10. The energy monitor unit 17 may include a beam splitter 17a arranged on a light path of the laser beam outputted from the output coupler 15, a collector lens 17b, a light sensor 17c, and so forth.

The gas control system 40 may include a gas controller 41, an exhauster 42, a laser gas supply 50, and so forth.

The laser gas supply 50 may be connected to a buffer gas supply 61 and a halogen gas supply 62 using pipes, and furthermore, the laser gas supply 50 may be connected to the laser chamber 10 via a control valve 43 using pipes.

For introducing buffer gas into the laser chamber 10 from the buffer gas supply 61, the laser gas supply 50 may include a mass flow controller (B-MFC) 51, a buffer gas introduction valve 52 and a bypass valve 53, which are configured to control a flow rate of buffer gas. For introducing halogen gas into the laser chamber 10 from the halogen gas supply 62, the laser gas supply 50 may be include a mass flow controller ($F_2$-MFC) 54, a halogen gas introduction valve 55 and a bypass valve 56, which are configured to control a flow rate of halogen gas.

The exhauster 42 may be a displacement pump, or the like, for instance, and the exhauster 42 may be connected to a pipe, which connects the laser gas supply 50 and the control valve 43, via an exhaust valve 44, a halogen filter (not illustrated), and so forth. Furthermore, the exhauster 42 may include a pipe for discharging exhausted gas to the atmosphere.

The buffer gas supply 61 may be a gas cylinder configured to supply mixed gas of argon (Ar) and neon (Ne), of which mixture ratio is a:b, as the buffer gas, for instance. The halogen gas supply 62 may be a gas cylinder configured to supply mixed gas of fluorine ($F_2$), argon and neon, of which mixture ratio is n:a:b, as the halogen gas, for instance.

1.2 Operation

1) Next, operations for exchanging total laser gas in the excimer laser apparatus according to the disclosure will be explained. Operations for exchanging total laser gas may be operations for exchanging a most part of laser gas in the chamber. That is, the operations for exchanging total laser gas may include a case where a small amount of laser gas is remained in the chamber after exchanging the total laser gas.

In the excimer laser apparatus according to the disclosure, for exchanging total laser gas, the laser controller 30 may transmit an instruction for exchanging laser gas to the gas controller 41 of the gas control system 40. The gas controller 41 may control each device by transmitting signals to each device.

Thereby, the gas controller 41 may cause the buffer gas introduction valve 52 and the halogen gas introduction valve 55 of the laser gas supply 50 to close, and activate the exhauster 42. At this time, the gas controller 41 may discharge gas in the laser chamber 10 by opening the exhaust valve 44 and the control valve 43.

The gas controller 41 may detect a pressure in the laser chamber 10 by the pressure sensor 16.

When the gas controller 41 determines that the pressure in the laser chamber 10 is equal to or less than a specific pressure, the gas controller 41 may introduce halogen gas into the laser chamber 10 by closing the exhaust valve 44 and opening the halogen gas introduction valve 55 and the bypass valve 56. After that, when the gas controller 41 determines that the laser chamber has been filled with gas to the extent that the pressure in the laser chamber 10 reached a specific pressure $PF_2$, the gas controller 41 may close the halogen gas introduction valve 55 and the bypass valve 56. Then, the gas controller 41 may introduce buffer gas in the laser chamber 10 by opening the buffer gas introduction valve 52 and the bypass valve 53. After that, when the gas controller 41 determines that the pressure in the laser chamber 10 reached a specific pressure $P_1$, the gas controller 41 may close the buffer gas introduction valve 52 and the bypass valve 53.

2) Next, operations for laser oscillating in the excimer laser apparatus according to the disclosure will be explained.

In the excimer laser apparatus of the disclosure, for laser oscillating, the laser controller 30 may control each device by inputting signals to each device. The laser controller 30 may transmit control signal for generating a specific charge voltage $Vhv_1$ to the charger 12. Furthermore, the laser controller 30 may apply a high voltage between the discharge electrodes 11a and 11b by activating the switch 13a in the PPM 13.

Thereby, discharge may be generated between the discharge electrodes 11a and 11b in the laser chamber 10, the laser gas between the electrodes may be excited, and light may be emitted. The emitted light may be resonated between the output coupler 15 and the grating 14b in the line narrow module 14, which form a laser resonator, and may oscillate as a laser beam by being amplified in the excited laser gas. An arrangement of the grating 14b in the line narrow module 14 may be a Littrow arrangement in which an incident angle and a diffraction angle become the same. The laser beam traveling in the laser resonator may output via the output coupler 15 as a narrowed laser beam narrowed by the prism 14a and the grating 14b in the line narrow module 14.

A part of the laser beam outputted via the output coupler 15 may enter the energy monitor unit 17, be partially reflected by the beam splitter 17a in the energy monitor unit 17, and enter the light sensor 17c via the collector lens 17b. Thereby, the light sensor 17c may detect pulse energy of the laser beam. The light transmitting the beam splitter 17a in the energy monitor unit 17 may enter the exposure apparatus 100.

The energy monitor unit 17 may output information about the pulse energy Er of the detected laser beam to the laser controller 30. The laser controller 30 may store, in the storage 31, the information as pulse energy $Ee(P_1, Vnv_1)$ detected at a case where the charge voltage is $Vhv_1$ and the total gas pressure of the laser gas is $P_1$.

The laser controller 30 may change an order value of the charge voltage to be applied to the charger 12 within a specific range. At this time, the laser controller 30 may store, in the storage 31, each pulse energy $Ee(P_1, Vhv_1)$, $Ee(P_1, Vhv_2)$, . . . , $Ee(P_1, Vhv_n)$ corresponding to each charge voltage ($Vhv_1, Vhv_2, \ldots, Vhv_n$), and so forth.

The laser controller 30 may change the total gas pressure P of the laser gas within a specific range via the gas controller 41. At this time, the laser controller 30 may store, in the storage 31, each pulse energy $Ee(P_1, Vhv_1)$, $Ee(P_2, Vhv_2)$, . . . , $Ee(P_n, Vhv_n)$ corresponding to each total gas pressure ($P_1, P_2, \ldots, P_n$) and each charge voltage ($Vhv_1, Vhv_2, \ldots, Vhv_1$), and so forth.

The laser controller 30 may calculate an approximate expression capable of calculating pulse energy Eec which is supposed to be obtained directly after gas exchange based on the total gas pressure P of the laser gas and the charge voltage Vhv, and the laser controller 30 may store the approximate expression in the storage 31.

3) Next, operations for controlling pulse energy in the excimer laser apparatus according to the disclosure will be explained. In the excimer laser according to the disclosure, pulse energy may be controlled, for example, while an exposure operation is conducted in the exposure apparatus 100.

In a case where pulse energy is controlled when exposure is conducted in the exposure apparatus 100, the exposure apparatus controller 110 in the exposure apparatus 100 may send target pulse energy Et of an outputted laser beam to the laser controller 30.

The laser controller 30 may set an order value of the charge voltage Vhv to be applied to the charger 12 so that pulse energies of outputted laser beams become the target pulse energy Et. The laser controller 30 may transmit trigger signals for applying a high voltage between the discharge electrodes 11a and 11b to the switch 13a of the PPM 13, and thereby, the discharge electrodes 11a and 11b may discharge, and the laser oscillator system 20 may laser-oscillate. As a result, laser beams may output via the output coupler 15.

The energy monitor unit 17 may detect pulse energy Er of an outputted laser beam. The laser controller 30 may execute a feedback control of the charge voltage Vhv based on a difference $\Delta E$ between the target pulse energy Et and actually outputted pulse energy Er.

4) Next, operations for exchanging a part of the laser gas in the excimer laser apparatus according to the disclosure will be explained. In the disclosure, there is a case where exchange of a part of the laser gas in the chamber is referred to as partial gas exchange.

In the excimer laser apparatus according to the disclosure, for conducting partial gas exchange, the laser controller 30 may set a partial gas exchange amount Q and transmit a partial gas exchange signal to the gas controller 41 for every constant shot number Np or at regular time intervals Tp.

When the gas controller 41 may receive the partial gas exchange signal, the gas controller 41 may transmit signals for flow rates of gasses at the mass flow controller (B-MFC) 41 and the mass flow controller ($F_2$-MFC) 54 becoming specific flow rate values, respectively.

The gas controller 41 may control each device as the followings by transmitting control signals to each device. The gas controller 41 may open the control valve 43 and close the exhaust valve 44, and then, open the buffer gas introduction valve 52 and the halogen gas introduction valve 55 at one time. After that, the gas controller 41 may detect a total gas pressure P of the laser gas by the pressure sensor 16. Then, the gas controller 41 may introduce the buffer gas and the halogen gas into the laser chamber 10 while detecting the total gas pressure of the laser gas. When the gas controller 41 detects that a detected value of the total gas pressure of the laser gas rose by $\Delta Pex$ (=Q/V), the gas controller 41 may close the buffer gas introduction valve 52 and the halogen gas introduction valve 55 at one time. The gas controller 41 may calculate a partial gas exchange amount Q based on a volume V in the laser chamber 10 and a raised gas pressure $\Delta Pex$ using the following formula (1).

$$Q = V \times \Delta Pex \quad (1)$$

Then, the gas controller 41 may activate the exhauster 42 and open the exhaust valve 44. After that, the gas controller 41 may continue the process of detecting the total gas pressure of the laser gas, and when the gas pressure in the laser chamber 10 drops to the initial total gas pressure P, the gas controller 41 may close the exhaust valve 44.

According to the above-described controlling, the partial gas exchange may be conducted.

5) Next, operations for controlling an impurity gas in the excimer laser apparatus according to the disclosure will be explained.

In the excimer laser apparatus according to the disclosure, for conducting a control of an impurity gas, the laser controller 30 may calculate pulse energy Eec which is supposed to be obtained directly after gas exchange where the current charge voltage Vhv and the current total gas pressure P of the laser gas are used, pulse energy Er having been obtained with the current charge voltage Vhv and the current total gas pressure P. The laser controller 30 may calculate the pulse energy Eec based on an approximate expression obtained by data measured directly after total gas exchange, which will be described later on.

After that, the laser controller 30 may calculate a concentration C of the impurity gas in the laser gas in the laser chamber 10 based on a reduction amount $\Delta Ed$ (=Eec−Er) of the pulse energy.

The laser controller 30 may transmit a signal for updating the partial gas exchange amount Q to the gas controller 41 based on a difference $\Delta C$ between the calculated concentration C of the impurity gas and a target concentration of the impurity gas. A specification of the partial gas exchange will be described later on.

6) Next, operations for correcting decay caused by degradation of discharge electrodes in the excimer laser apparatus according to the disclosure will be explained.

The above-described reduction amount $\Delta Ed$ (=Eec−Er) may be influenced by degradation of the discharge electrodes in addition to the influence of the impurity gas. Therefore, in order to estimate the concentration of the impurity gas accurately, the laser controller 30 may subtract an influence of degradation of the discharge electrodes from the reduction amount $\Delta Ed$. In the excimer laser apparatus according to the disclosure, for correcting decay caused by degradation of the discharge electrodes, the laser controller 30 may calculate the concentration C of the impurity gas with consideration of a reduction amount $\Delta En$ (=A×Nt) of energy that can be caused by degradation of the discharge electrodes 11*a* and 11*b* due to discharge. Here, Nt is the number of discharge between the discharge electrodes after gas exchange, and A is a proportional constant.

At this time, the concentration C of the impurity gas can also be calculated while the reduction amount $\Delta Ed$ of the pulse energy due to the impurity gas is replaced with $\Delta Ed - \Delta En$.

7) Next, effects in the excimer laser apparatus according to the disclosure will be described.

In the excimer laser apparatus according to the disclosure, the laser controller 30 may calculate the reduction amount $\Delta Ed$ of the pulse energy from the pulse energy Eec which is supposed to be obtained directly after gas exchange and the pulse energy Er measured under the current state based on $\Delta Ed = Eec - Er$. At this time, the pulse energy Eec which is supposed to be obtained directly after gas exchange and the pulse energy Er measured under the current state may be obtained under the approximately same conditions of the total gas pressure P and the charge voltage Vhv. Accordingly, the laser controller 30 may calculate the pulse energy Eec which is supposed to be obtained directly after gas exchange from the total gas pressure P of the laser gas and the charge voltage Vhv in the pulse energy Er under the current state based on the above-described approximate expression. Furthermore, the laser controller 30 may calculate the concentration C of the impurity gas existing in the laser gas in the laser chamber 10 based on the reduction amount $\Delta Ed$ of the pulse energy, and conduct partial gas exchange so that the concentration C becomes a specific impurity concentration Ct. Thereby, the laser controller 30 may be able to adjust the concentration C of the impurity gas in the laser chamber 10 to a specific value.

In such case, even if the target energy Et drastically changes among 10 to 20 mJ (in a case of 6 kHz, 60 to 90 W), the laser controller 30 can calculate the concentration C of the impurity gas in the laser gas in the laser chamber 10 from the reduction amount $\Delta Ed$ of the pulse energy. Thereby, the laser controller 30 may control the concentration C of the impurity gas in the laser chamber 10 to be a desired value. Furthermore, the laser controller 30 may calculate the reduction amount of the pulse energy caused by the impurity gas with high accuracy by correcting decay caused by degradation of the discharge electrodes 11*a* and 11*b* due to discharge.

As described above, according to the control of the laser apparatus of the disclosure, even in a case where the laser apparatus operates for a long time, e.g. an interval of the total gas exchange is long, the laser apparatus can be used stably.

In the above description, the laser apparatus with the line narrow module 14 including the grating 14*b* being a wavelength selection element is described. However, it is not limited to such laser apparatus, and it is also possible to apply to an excimer laser with a free-propagation resonator including an output coupler and a rear mirror, for instance, and without a wavelength selection element. Furthermore, it is also possible to apply to an amplifier (PA or PO) including an excimer laser gas.

The laser controller 30 may adjust a frequency of the partial gas exchange by changing parameters such as the number of shots Np, the regular time intervals Tp, or the like.

1.3 Relationship Between Amount of Impurity Gas and Laser Power

Next, a relationship between an amount of the impurity gas and a laser power will be described. Generally, between the concentration C of the impurity gas included in the laser chamber 10 and the reduction amount ΔEd of the pulse energy by the impurity gas, a relationship represented by the following formula (2) may be established.

$$\Delta Ed = Ee - Er = K \times C \quad (2)$$

Here, the pulse energy Ee is pulse energy of a laser beam directly after total gas exchange, i.e., pulse energy of a laser beam in a state where few impurity gas exists in the laser chamber 10. Furthermore, Er is pulse energy of a laser beam in a state where a concentration of the impurity gas in the laser chamber 10 becomes C. K is a proportional constant. According to the formula (2), the concentration C of the impurity gas in the laser chamber 10 can be calculated using the following formula (3).

$$C = \Delta Ed/K = (Ee - Er)/K \quad (3)$$

Accordingly, the laser controller 30 can calculate the concentration C of the impurity gas using the formula (3) by conducting measurement of the pulse energy Ee directly after total gas exchange, and then measuring the pulse energy Er after the elapse of a specific number of shots or a specific period of time.

A relationship between the total gas pressure P of the laser gas in the laser chamber 10 and pulse energy E of an outputted laser beam may be approximated by the following formula (4).

$$E = A_E \times P^2 + B_E \times P^2 + C_E \times P + D_E \quad (4)$$

Here, $A_E$, $B_E$, $C_E$, $D_E$, which are coefficients, can be approximated by the following formulas (5) to (8), respectively.

$$A_E = a_1 \times Vhv^2 + b_1 \times VhV + c_1 \quad (5)$$

$$B_E = A_2 \times Vhv^2 + B_2 \times VhV + C_2 \quad (6)$$

$$C_E = a_3 \times Vhv^2 + b_3 \times VhV + c_3 \quad (7)$$

$$D_E = a_4 \times Vhv^2 + b_4 \times VhV + c_4 \quad (8)$$

Here, $a_1$, $b_1$, $c_1$, $a_2$, $b_2$, $c_2$, $a_3$, $b_3$, $c_3$, $a_4$, $b_4$ and $c_4$ are coefficients. These twelve coefficients may be calculated by the laser controller 30 using a least-square technique based on the pulse energies $Ee(P_1, Vhv_1)$ and $Ee(P_2, Vhv_2)$, . . . , $Ee(P_n, Vhv_n)$, which are measured by changing the total gas pressure P and the charge voltage Vhv directly after gas exchange.

Figure 2:
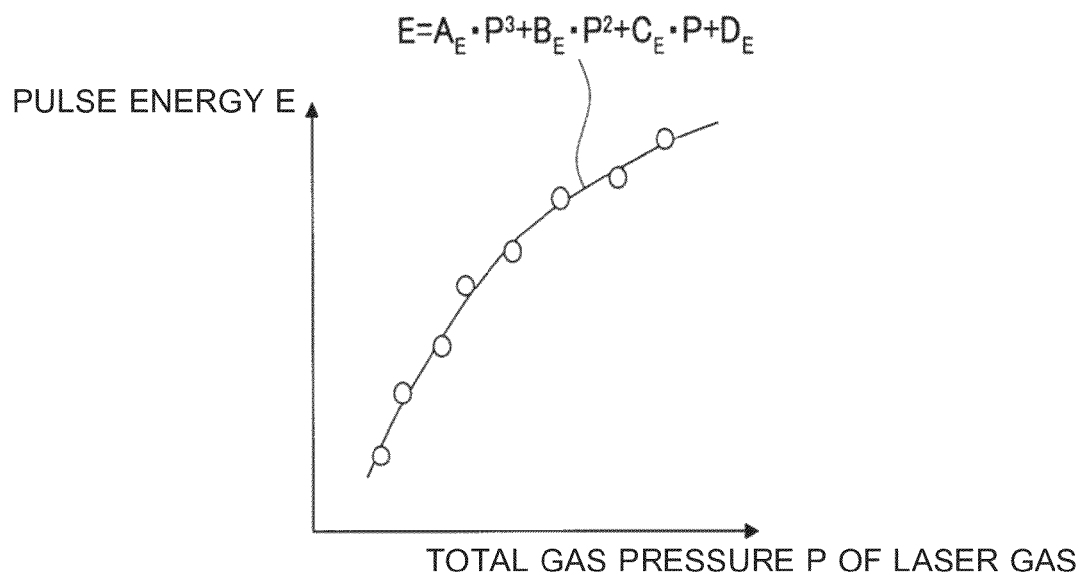
FIG. 2 is an explanatory diagram (1) of a control method of the laser apparatus according to the disclosure.
Figure 3:
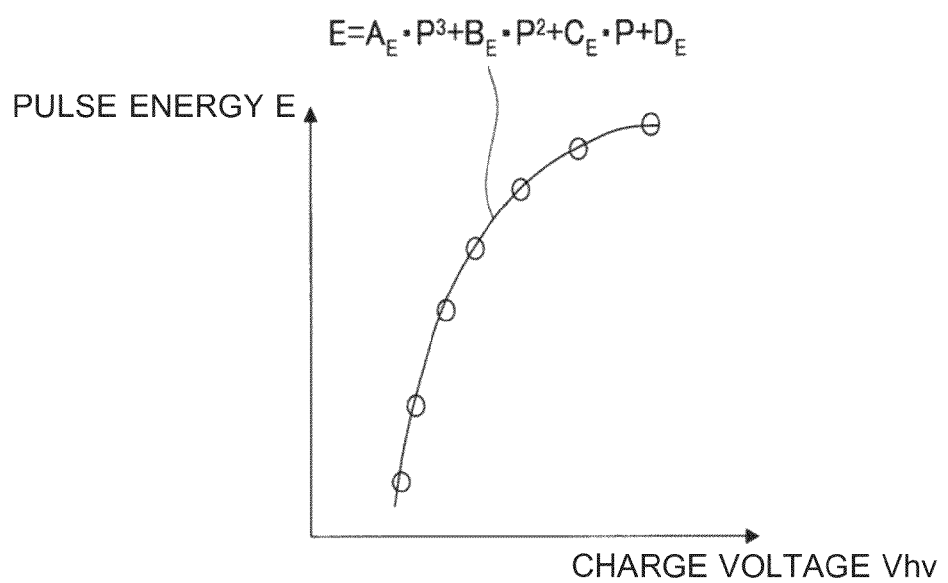
FIG. 3 is an explanatory diagram (2) of the control method of the laser apparatus according to the disclosure.

Thereby, the laser controller 30 can obtain the approximate expression indicating the relationship between the pulse energy E represented by the formula (4), the total gas pressure P of the laser gas and the charge voltage Vhv. FIG. 2 shows an example of the relationship between the total gas pressure P of the laser gas and the pulse energy E in the formula (4), and FIG. 3 shows the relationship between the charge voltage Vhv and the pulse energy E in the formula (4).

The laser controller 30 may measure the pulse energy Ee of the laser beam directly after the total gas exchange by changing the total gas pressure P of the laser gas in the laser chamber 10 and the charge voltage Vhv as parameters, and based on a result of the measurement, decide the coefficients in the formulas (5) to (8). Thereby, the laser controller 30 can obtain the formula (4) which corresponds to a state where impurity gas scarcely exists directly after the total gas exchange. At this time, the laser controller 30 may collect data while setting the number of values of the total gas pressures P to be set as 4 or more and the number of values of the charge voltages Vhv to be set as 3 or more depending on the number of unknowns in the formulas (5) to (8).

Therefore, by assigning a value of the total gas pressure P in the laser chamber 10 and a value of the charge voltage Vhv, which are values after a specific period of time passes from gas exchange, to the formula (4), the laser controller 30 can calculate the pulse energy Eec which is supposed to be obtained under the state where the total gas pressure is P and the charge voltage is Vhv directly after the total gas exchange. Based on the pulse energy Eec calculated in this manner and the pulse energy Er measured after the elapse of a specific number of shots or a specific period of time from gas exchange, the laser controller 30 can calculate the reduction amount ΔEd (=Eec−Er). Here, the number of shots may be the number of discharges or the number of oscillations. Furthermore, based on the reduction amount ΔEd, from the formula (3), the laser controller 30 can calculate the concentration C of the impurity gas in the laser chamber 10.

2. Control Flow of Impurity Gas in First Embodiment (Control of Impurity Gas)

Figure 4:
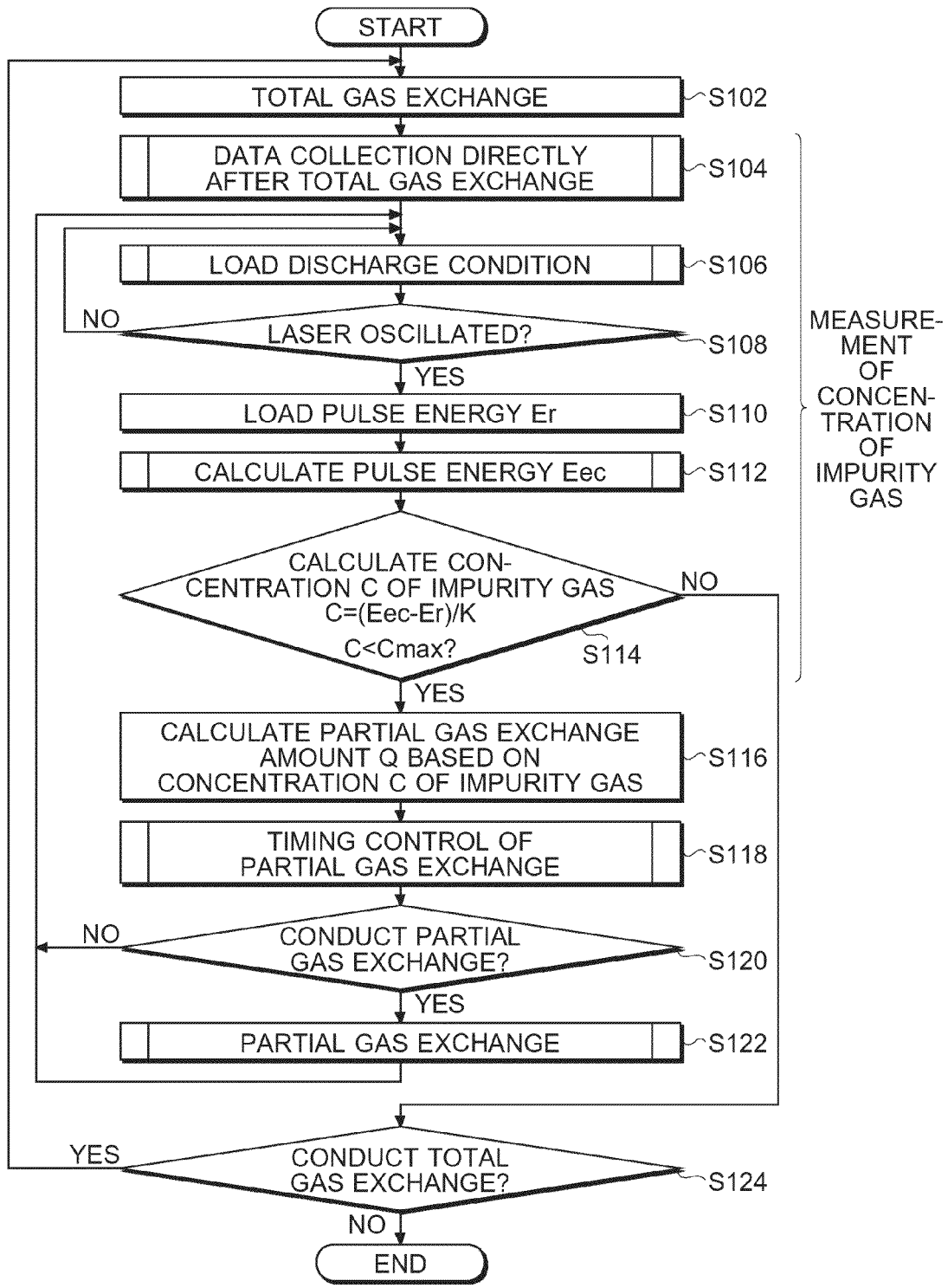
FIG. 4 is a flowchart (1) for explaining a control method of a laser apparatus according to a first embodiment of the disclosure.

Next, as a control method of a laser apparatus according to a first embodiment, a main routine of a control flow of the impurity gas in the laser gas in the laser chamber 10 will be explained using FIG. 4. Here, based on the control flow of the impurity gas, the laser controller 30 in the laser apparatus may control each device connected thereto.

Firstly, in step S102, the laser controller 30 may conduct total gas exchange of the laser gas in the laser chamber 10. After that, the laser controller 30 may reset a pulse counter Nt for counting the number of laser oscillations or discharges after total gas exchange and a pulse counter Np for counting the number of laser oscillations or discharges after partial gas exchange.

Then, in step S104, the laser controller 30 may collect data directly after the total gas exchange. Specifically, the laser controller 30 may execute a process of a subroutine of the data collection directly after the total gas exchange shown in FIG. 5, which will be described later on.

Then, in step S106, the laser controller 30 may load discharge conditions for discharging in the laser chamber 10. Specifically, the laser controller 30 may execute a process of a subroutine of the load of the discharge conditions shown in FIG. 6, which will be described later on.

Then, in step S108, the laser controller 30 may apply a voltage between the discharge electrodes 11a and 11b based on the discharge conditions loaded in step S106, and then determine whether the laser apparatus laser-oscillates or not. When the laser apparatus laser-oscillates, the laser controller 30 may progress to step S110. On the other hand, when the laser apparatus does not laser-oscillate, the laser controller 30 may wait until the laser apparatus laser-oscillates by returning to step S106.

Then, in step S110, the laser controller 30 may load current pulse energy Er. Specifically, the laser controller 30 may load the current pulse energy Er under the discharge conditions loaded in step S106 by measuring energy of a laser beam outputted by the laser oscillation using the energy monitor unit 17, or the like.

Then, in step S112, the laser controller 30 may calculate, if the laser controller 30 has used the discharge conditions loaded in step S106, the pulse energy Eec which is supposed to be obtained directly after the total gas exchange. Specifically, the laser controller 30 may execute a subroutine of calculation of the pulse energy Eec shown in FIG. 7, which will be described later on.

Then, in step S114, the laser controller 30 may calculate a concentration C of the impurity gas in the laser chamber 10. Specifically, the laser controller 30 may calculate a concentration C of the impurity gas based on the current pulse energy Er loaded in step S110 and the pulse energy Eec calculated in step S112 using the following formula (9).

$$C = \Delta Ed/K = (Eec - Er)/K \qquad (9)$$

Furthermore, the laser controller 30 may determine whether the concentration C is smaller than an acceptable concentration Cmax (C<Cmax) by comparing the calculated concentration C of the impurity gas and the acceptable concentration Cmax of the impurity gas; the acceptable concentration Cmax being an index of total gas exchange. When the concentration C of the impurity gas is smaller than the acceptable concentration Cmax (C<Cmax), the laser controller 30 may progress to step S116. On the other hand, when the concentration C of the impurity gas is not smaller than the acceptable concentration Cmax, the laser controller may progress to step S124.

Then, in step S116, the laser controller 30 may calculate a partial gas exchange amount Q for partial gas exchange based on the concentration C of the impurity gas calculated in step S114. Specifically, the laser controller 30 may calculate the partial gas exchange amount Q using the following formula (10). Here, H is a proportional constant.

$$Q = H \times C \qquad (10)$$

Then, in step S118, the laser controller 30 may execute a timing control of partial gas exchange. Specifically, the laser controller 30 may execute a subroutine of the timing control of the partial gas exchange shown in FIG. 9, which will be described later on.

Then, in step S120, the laser controller 30 may determine whether partial gas exchange should be conducted or not. When the partial gas exchange should be conducted, the laser controller 30 may progress to step S122. On the other hand, when the partial gas exchange does not have to be conducted, the laser controller 30 may return to step S106.

Then, in step S122, the laser controller 30 may conduct the partial gas exchange. Specifically, the laser controller 30 may execute a subroutine of the partial gas exchange shown in FIG. 11, which will be described later on. At this time, the laser controller 30 may conduct the partial gas exchange of the laser gas in the laser chamber 10 based on the partial gas exchange amount Q calculated in step S116. After the partial gas exchange, the laser controller 30 may wait a specific period of time, and then return to step S106.

In step S124, the laser controller 30 may determine whether total gas exchange should be conducted or not. Because the concentration C is not smaller than the acceptable concentration Cmax in step S114, when the total gas exchange should be conducted, the laser controller 30 may return to step S102. On the other hand, there is a case where the total gas exchange should not be conducted such as a case where the laser controller 30 stops the apparatus directly after the exposure apparatus 100 transmits an arrest command to the laser controller 30, or the like. In such case, the laser controller 30 may finish the operation without the total gas exchange.

In this way, the laser controller 30 may finish the control flow of the impurity gas in the laser gas in the laser chamber 10.

(Data Collection Directly after Total Gas Exchange)

Figure 5:
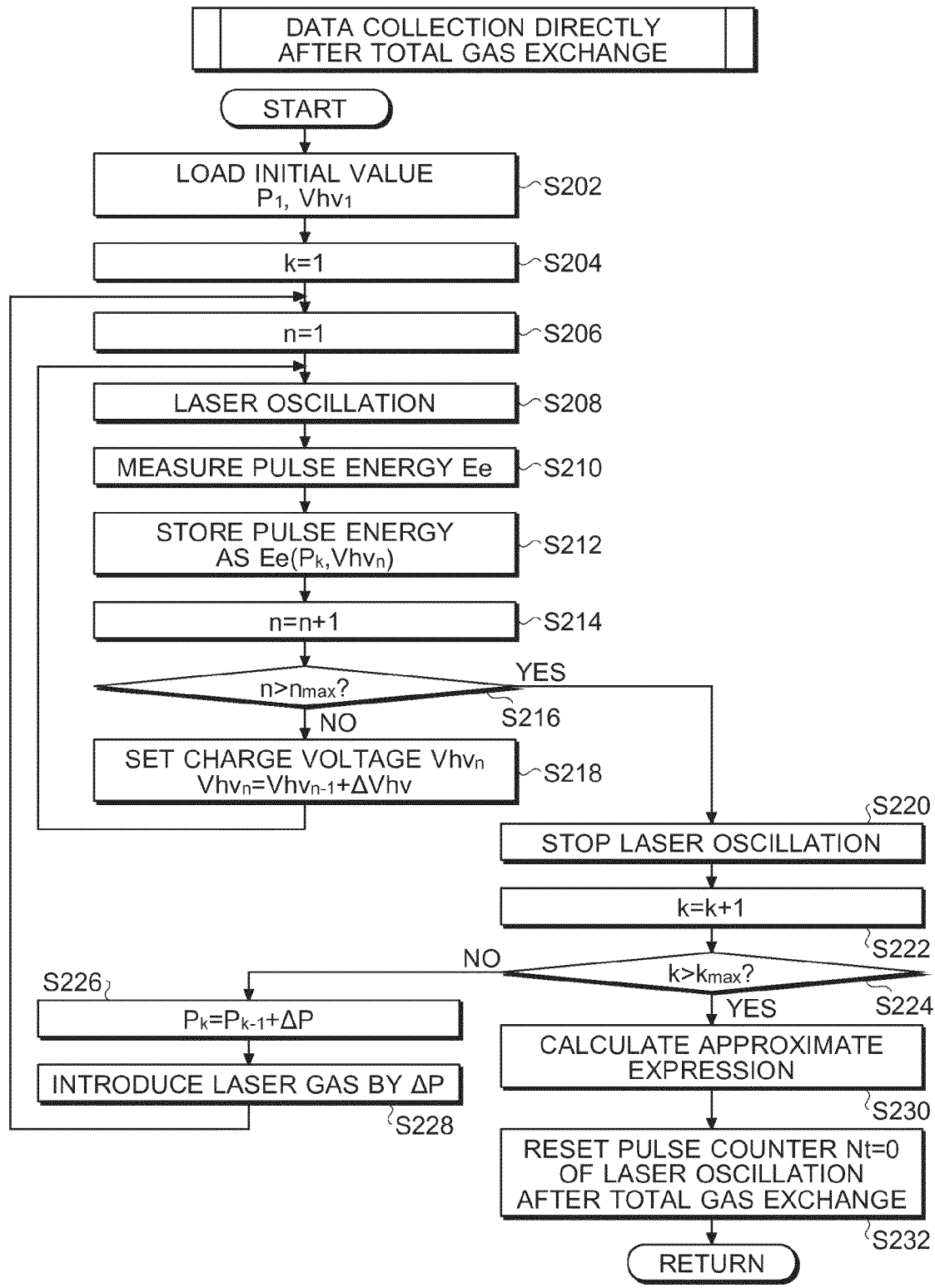
FIG. 5 is a flowchart (2) for explaining the control method of the laser apparatus according to the first embodiment of the disclosure.

Next, the subroutine of data collection directly after total gas exchange of step S104 in the main routine will be explained using FIG. 5. The laser controller 30 may control each device connected thereto based on the subroutine of the data collection directly after total gas exchange.

Firstly, in step S202, the laser controller 30 may load a total gas pressure $P_1$ in the laser chamber 10 and a charge voltage $Vhv_1$, which are initial values.

Then, in step S204, the laser controller 30 may set a value in a counter k as 1. The counter k may count until the number of values of total gas pressures becomes the number $k_{max}$ of values of total gas pressures arranged for data collection. The number $k_{max}$ of the values of total gas pressures arranged for data collection may be preset to the laser controller 30.

Then, in step S206, the laser controller 30 may set a value in a counter n as 1. The counter n may count until the number of values of charge voltages becomes the number $n_{max}$ of values of charge voltages arranged for data collection. The number $n_{max}$ of the values of charge voltages arranged for data collection may be preset to the laser controller 30.

Then, in step S208, the laser controller 30 may conduct laser oscillation under conditions of the current total gas pressure $P_k$ and the current charge voltage $Vhv_n$.

Then, in step S210, the laser controller 30 may measure pulse energy Ee under the conditions of the total gas pressure $P_k$ and the charge voltage $Vhv_n$ using the energy monitor unit 17.

Then, in step S212, the laser controller 30 may store the conditions of the total gas pressure $P_k$ and the charge voltage $Vhv_n$ used for the laser oscillation in step S208 and the pulse energy $Ee(P_k, Vhv_n)$ measured in step S210 in the storage 31 while the conditions and the pulse energy Ee are associated with each other.

Then, in step S214, the laser controller may increase the current value of the counter n by 1.

Then, in step S216, the laser controller 30 may determine whether the value of the counter n exceeds the number $n_{max}$ or not. When the value of the counter n does not exceed the number $n_{max}$, the laser controller may progress to step S218. On the other hand, when the value of the counter n exceeds the number $n_{max}$, the laser controller 30 may progress to step S220.

Then, in step S218, the laser controller 30 may set a new charge voltage $Vhv_n$. Specifically, the laser controller 30 may calculate the new charge voltage $Vhv_n$ by adding a specific increment $\Delta Vhv$ of the charge voltage to the currently set, or the like, charge voltage $Vhv_{n-1}$. After that, the laser controller 30 may return to step S208.

Then, in a case where the laser controller 30 progresses to step S220 from step S216, the laser controller 30 may stop the laser oscillation.

Then, in step S222, the laser controller 30 may increase the current value of the counter k by 1.

Then, in step S224, the laser controller 30 may determine whether the value of the counter k exceeds the number $k_{max}$ or not. When the value of the counter k does not exceed the number $k_{max}$, the laser controller 30 may progress to step S226. On the other hand, when the value of the counter k exceeds the number $k_{max}$, the laser controller 30 may progress to step S230.

When the laser controller 30 progresses to step S226, the laser controller 30 may set a new total gas pressure $P_k$ in the laser chamber 10. Specifically, the laser controller 30 may calculate the new total gas pressure $P_k$ by adding a specific increment $\Delta P$ of the total gas pressure to the currently set, or the like, total gas pressure $P_{k-1}$.

Then, in step S228, the laser controller 30 may introduce the buffer gas and the halogen gas so that the total gas pressure of the laser gas in the laser chamber 10 increases by the specific increment $\Delta P$. Specifically, the laser controller 30 may adjust the mass flow controller 51, the buffer gas introduction valve 52, the mass flow controller 54 and the halogen gas introduction valve 55 by controlling the gas controller 41 in order to introduce the buffer gas and the halogen gas so that the total gas pressure in the laser chamber 10 increases by the specific increment $\Delta P$. After that, the laser controller 30 may return to step S206.

When the laser controller 30 progresses to step S230 from step S224, the laser controller 30 may calculate an approximate expression indicating a relationship between the pulse energy E, the total gas pressure P of the laser gas and the charge voltage Vhv. Specifically, the laser controller 30 may calculate the approximate expression shown as the formula (4). The laser controller 30 may store the calculated approximate expression in the storage 31. Instead of the method of calculating the approximate expression, the laser controller 30 may create a table representing a correlationship between the pulse energy E, the total gas pressure P of the laser gas and the charge voltage Vhv, and store the created table in the storage 31. In such case, the pulse energy Eec which is supposed to be obtained directly after total gas exchange may be obtained based on the table.

Then, in step S232, the laser controller 30 may reset the value of the pulse counter Nt which counts the number of laser oscillations after the total gas exchange as 0.

In this way, the laser controller 30 may finish the subroutine of data collection directly after the gas exchange. After that, the laser controller 30 may return to the main routine, and progress to step S106 in the flowchart shown in FIG. 4.

(Load of Discharge Condition)

Figure 6:
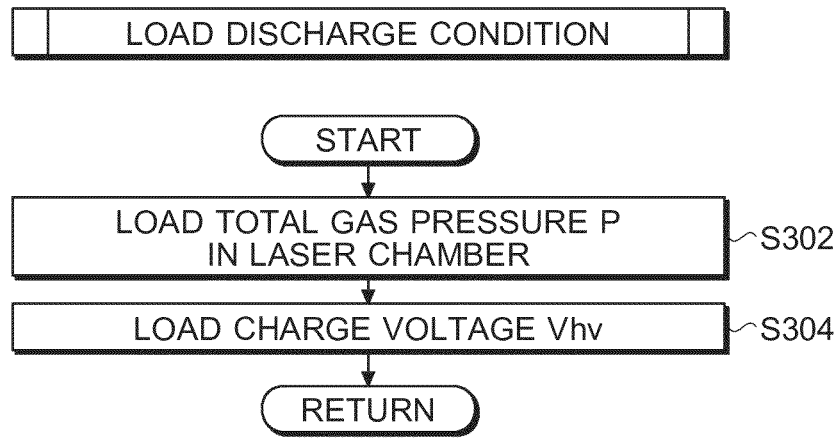
FIG. 6 is a flowchart (3) for explaining the control method of the laser apparatus according to the first embodiment of the disclosure.

Next, a subroutine of the load of the discharge conditions in step S106 in the main routine will be explained using FIG. 6. The laser controller 30 may control each device connected thereto based on the subroutine of the load of the discharge conditions.

Firstly, in step S302, the laser controller 30 may load a value of a total gas pressure in the laser chamber 10. Specifically, the laser controller 30 may measure the value of the total gas pressure P in the laser chamber 10 using the pressure sensor 16, and load the measured value.

Next, in step S304, the laser controller 30 may load a value of a charge voltage Vhv under the current state.

In this way, the laser controller 30 may finish the subroutine of the load of the discharge conditions. After that, the laser controller 30 may return to the main routine, and progress to step S108 in the flowchart shown in FIG. 4.

(Calculation 1 of Pulse Energy Eec)

Figure 7:
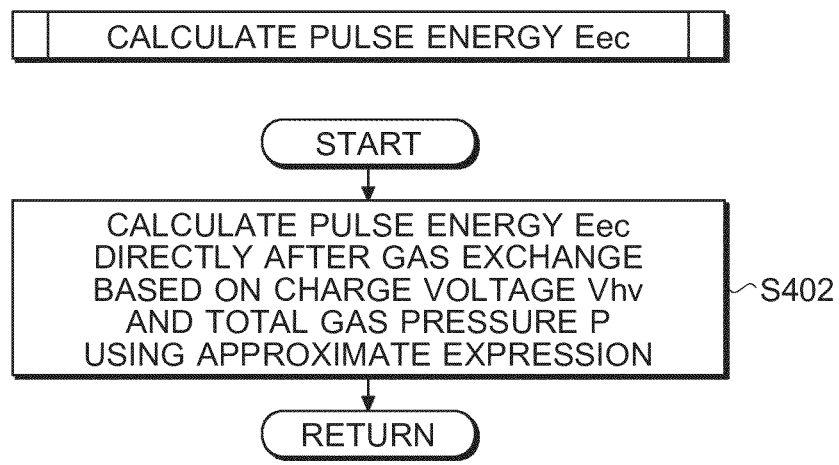
FIG. 7 is a flowchart (4) for explaining the control method of the laser apparatus according to the first embodiment of the disclosure.

Next, a subroutine of the calculation of the pulse energy Eec of step S112 in the main routine will be explained using FIG. 7. The subroutine of the calculation of the pulse energy Eec may be executed on the laser controller 30.

In step S402, the laser controller 30 may calculate the pulse energy Eec which is supposed to be obtained directly after the total gas exchange. Specifically, the laser controller 30 may calculate the pulse energy Eec which is supposed to be obtained directly after the total gas exchange using the following formula (11) based on the total gas pressure P of the laser gas and the charge voltage Vhv which are the discharge conditions loaded in step S106. The formula (11) may be obtained based on the formula (4) described above.

$$Eec = A_E \times P^3 + B_E \times P^2 + C_E \times P + D_E \quad (11)$$

In this way, the laser controller 30 may finish the subroutine of the calculation of the pulse energy Eec. After that, the laser controller 30 may return to the main routine, and progress to step S114 in the flowchart shown in FIG. 4.

(Calculation 2 of Pulse Energy Eec)

Figure 8:
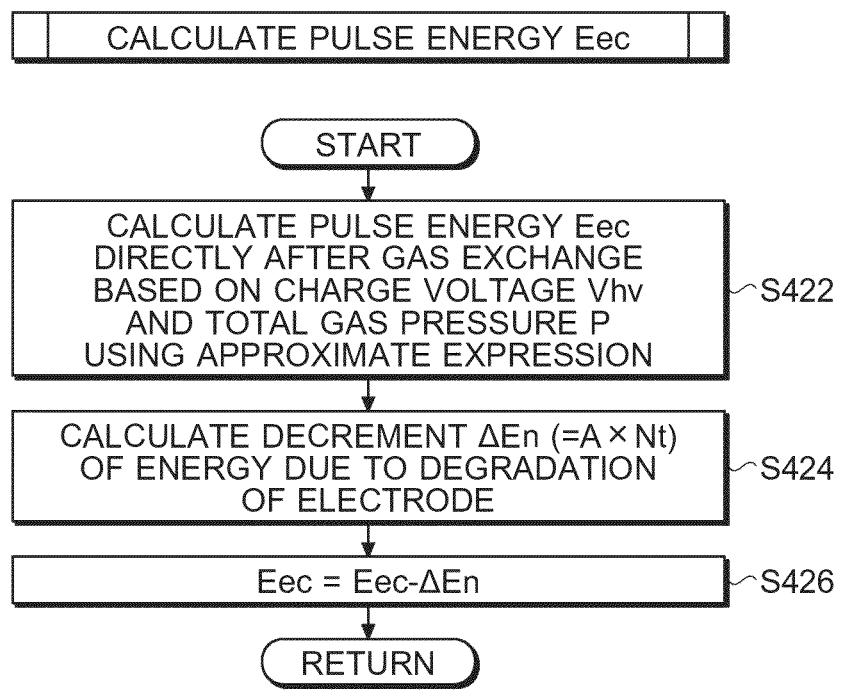
FIG. 8 is a flowchart (5) for explaining the control method of the laser apparatus according to the first embodiment of the disclosure.

In the subroutine of the calculation of the pulse energy Eec, as shown in FIG. 8, the pulse energy Eec may be calculated with a consideration of degradation of the discharge electrodes 11a and 11b.

Firstly, in step S422, the laser controller 30 may calculate the pulse energy Eec which is supposed to be obtained directly after the total gas exchange. Specifically, the laser controller 30 may calculate, based on the total gas pressure P of the laser gas and the charge voltage Vhv which are the discharge conditions loaded in step S106, the pulse energy Eec which is supposed to be obtained directly after the total gas exchange under the condition using the formula (11).

Then, in step S424, the laser controller 30 may calculate a decrement $\Delta En$ of energy caused by degradation of the discharge electrodes 11a and 11b based on $\Delta En = A \times Nt$. As described above, Nt is the number of discharges between the discharge electrodes after gas exchange, and A is a proportional constant.

Then, in step S426, the laser controller 30 may calculate new pulse energy Eec by subtracting the decrement $\Delta En$ of energy caused by degradation of the discharge electrodes 11a and 11b calculated in step S424 from the pulse energy Eec calculated in step S422.

In this way, the laser controller 30 may finish the subroutine of the calculation of the pulse energy Eec. After that, the laser controller 30 may return to the main routine, and progress to step S114 in the flowchart shown in FIG. 4. Instead of step S426, the reduction amount $\Delta Ed$ (=Eec−Er) of pulse energy due to the impurity, which is described in step S114, is replaced with $\Delta Ed - \Delta En$.

(Timing Control 1 of Partial Gas Exchange)

Figure 9:
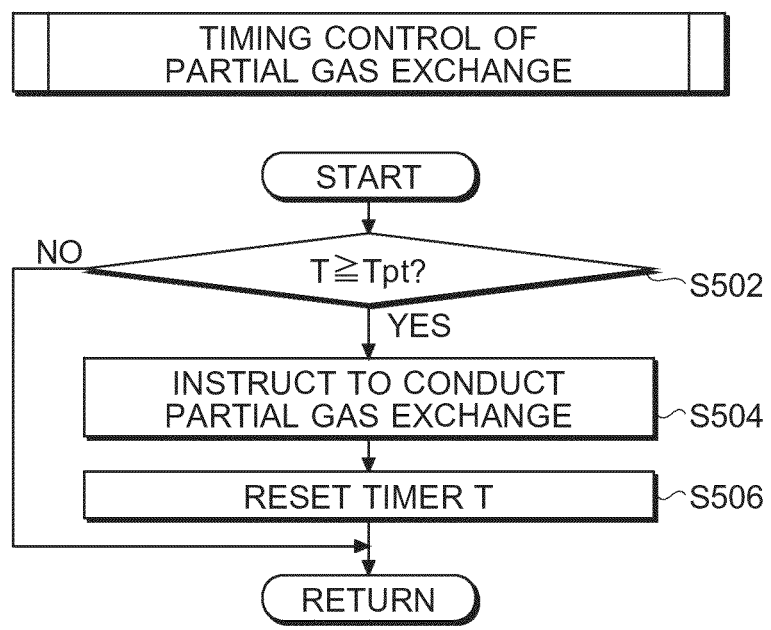
FIG. 9 is a flowchart (6) for explaining the control method of the laser apparatus according to the first embodiment of the disclosure.

Next, a subroutine of a timing control of partial gas exchange in step S118 of the main routine will be explained using FIG. 9. The subroutine of a timing control of partial gas exchange may be conducted based on a control of the laser controller 30. In the subroutine of a timing control of partial gas exchange, as shown in FIG. 9, a timing of partial gas control may be determined based on a discharge time.

Firstly, in step S502, the laser controller 30 may determine whether a value of a timer T for counting a discharge time in the laser chamber 10 is equal to or greater than a cycle Tpt of timing of partial gas exchange or not. When the value of the timer T is equal to or greater than the cycle Tpt of the timing of partial gas exchange, the laser controller 30 may progress to step S504. When the value of the timer T is not equal to or greater than the cycle Tpt of the timing of partial gas exchange, the laser controller 30 may finish the subroutine of the timing control of partial gas exchange.

In step S504, the laser controller 30 may transmit an instruction for conducting partial gas exchange with the value of the partial gas exchange amount Q to the gas controller 41.

Then, in step S506, the laser controller 30 may reset the value of the timer T for counting the discharge time in the laser chamber 10. After that, the laser controller 30 may finish the subroutine of the timing control of partial gas exchange. After the subroutine of the timing control of partial gas exchange has been finished, the laser controller 30 may return to the main routine, and progress to step S120 in the flowchart shown in FIG. 4.

(Timing Control 2 of Partial Gas Exchange)

Figure 10:
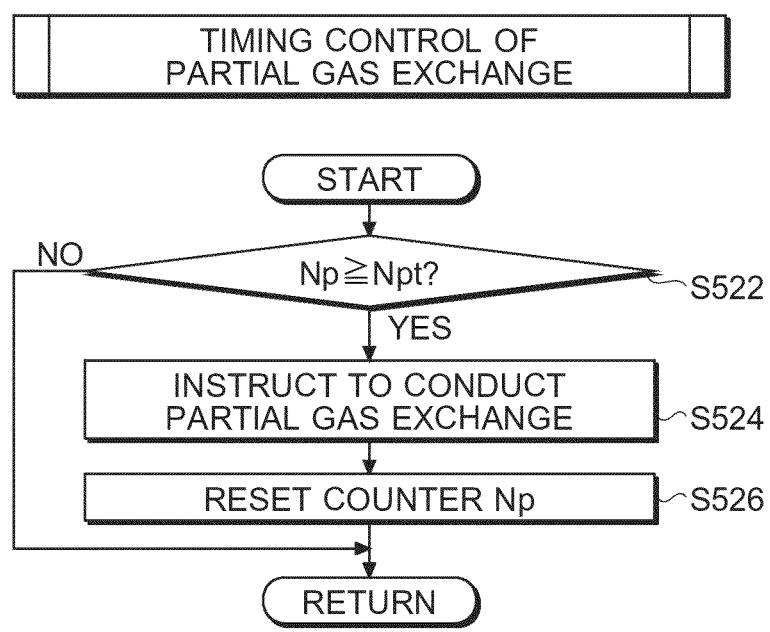
FIG. 10 is a flowchart (7) for explaining the control method of the laser apparatus according to the first embodiment of the disclosure.

In the subroutine of the timing control of partial gas exchange of step S118 in the main routine, as shown in FIG. 10, a timing of partial gas exchange may be determined based on the number of pulses of laser oscillation.

Firstly, in step S522, the laser controller 30 may determine whether a value of the counter Np for counting the number of pulses of laser oscillation is equal to or greater than the number Npt of pulses of laser oscillation being a timing for partial gas exchange or not. When the value of the counter Np is equal to or greater than the number Npt of pulses of laser oscillation being the timing for partial gas exchange, the laser controller 30 may progress to step S524. When the value of the counter Np is not equal to or greater than the number Npt of pulses of laser oscillation being the timing for partial gas exchange, the laser controller 30 may finish the subroutine of the timing control of partial gas exchange.

In step S524, the laser controller 30 may transmit an instruction for conducting partial gas exchange with a value of the partial gas exchange amount Q to the gas controller 41.

Then, in step S526, the laser controller 30 may reset the value of the counter Np for counting the number of pulses of laser oscillation. After that, the laser controller 30 may finish the subroutine of the timing control of partial gas exchange. After the subroutine of the timing control of partial gas exchange has been finished, the laser controller 30 may return to the main routine, and progress to step S120 in the flowchart shown in FIG. 4.

(Partial Gas Exchange)

Figure 11:
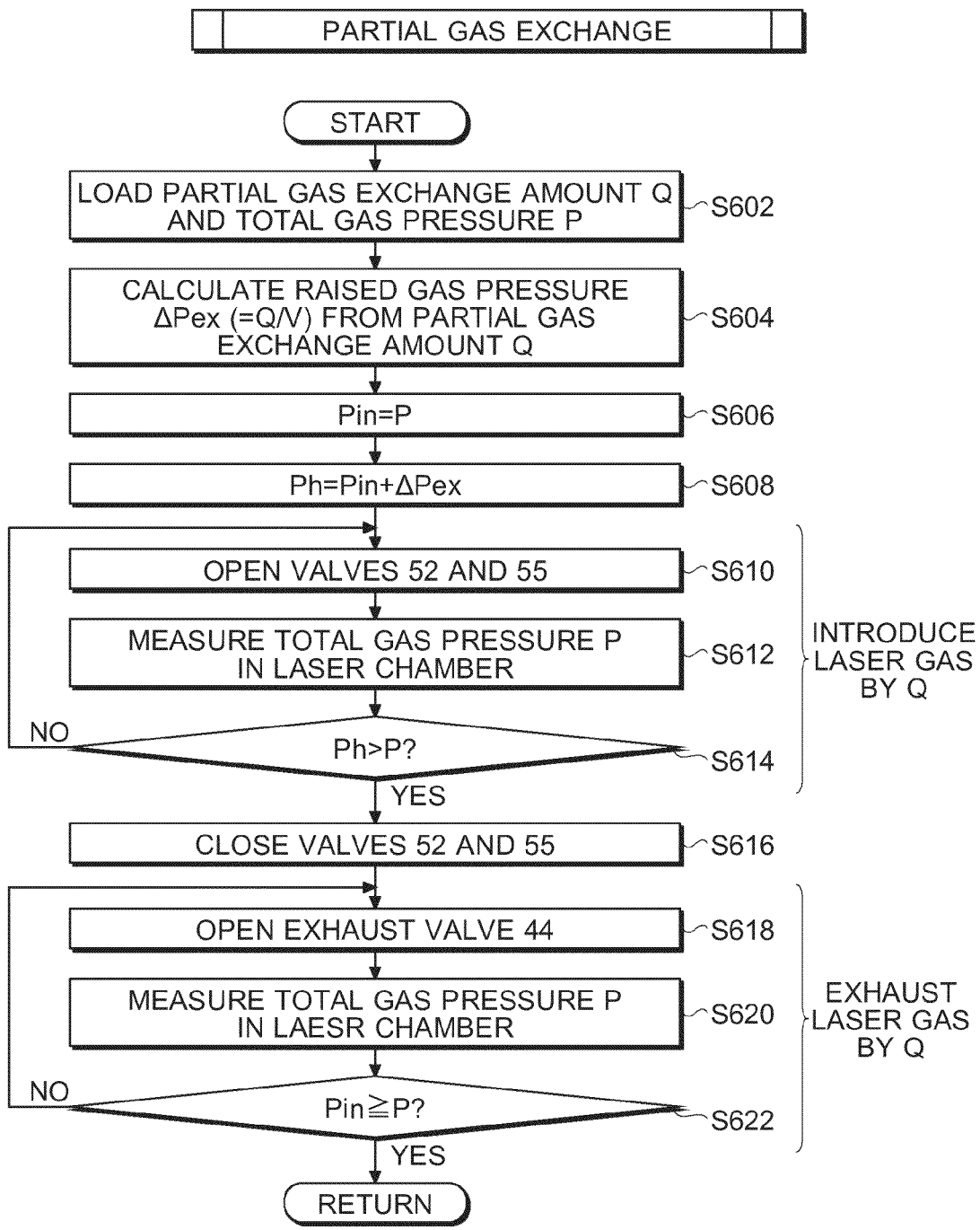
FIG. 11 is a flowchart (8) for explaining the control method of the laser apparatus according to the first embodiment of the disclosure.
Figure 12:
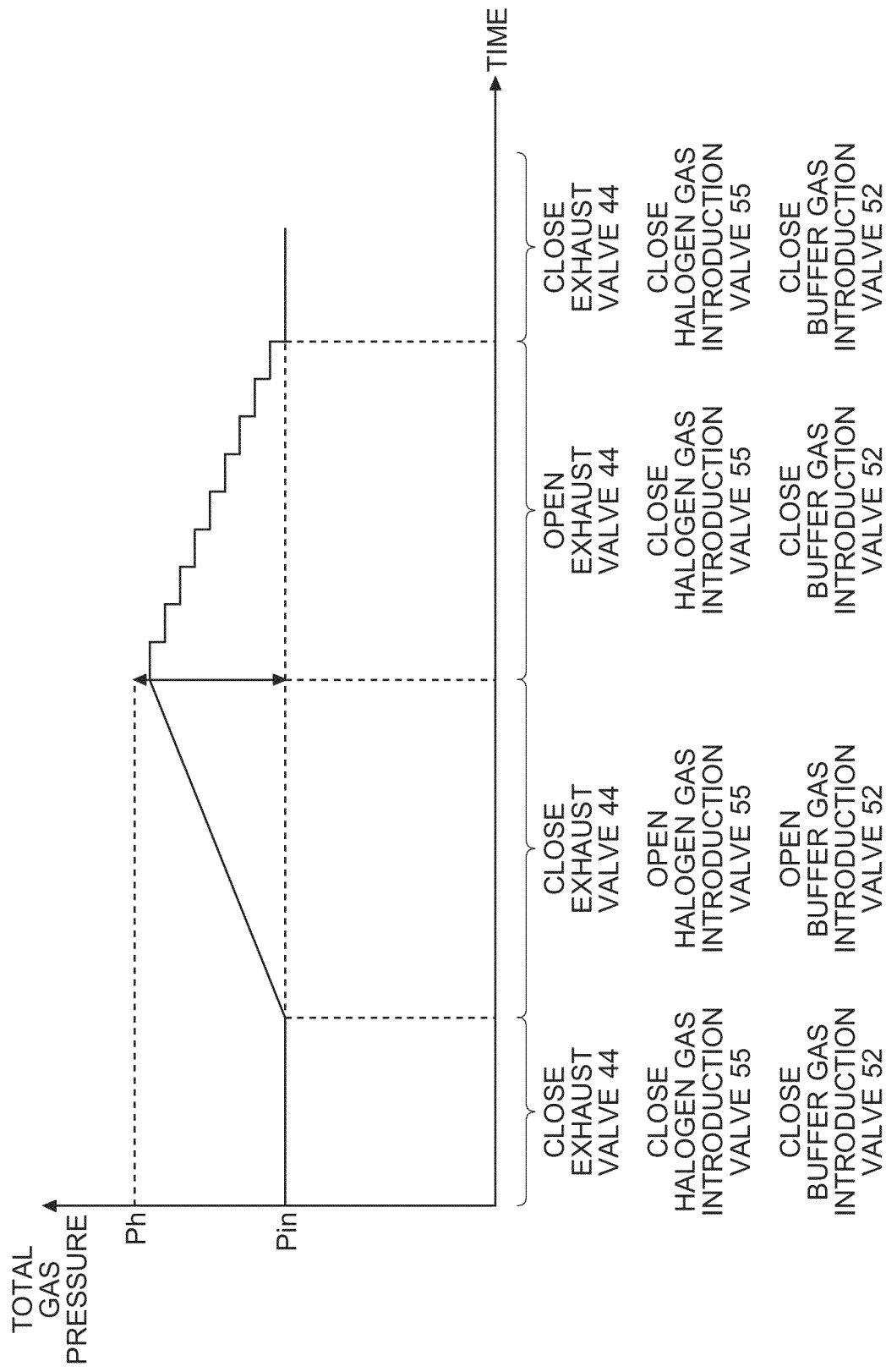
FIG. 12 is an explanatory diagram of a variation of a total gas pressure at a time of a partial gas exchange.

Next, a subroutine of partial gas exchange of step S122 in the main routine will be explained using FIGS. 11 and 12. Based on the subroutine of partial gas exchange, the laser controller 30 may control each device connected thereto. FIG. 11 shows a flowchart of the subroutine of partial gas exchange, and FIG. 12 shows a variation of a total gas pressure in the laser chamber 10 during partial gas exchange.

Firstly, in step S602, the laser controller 30 may load the partial gas exchange amount Q and the total gas pressure P. Specifically, the laser controller 30 may load the total gas pressure P by measuring a pressure in the laser chamber 10 using the pressure sensor 16 while loading the partial gas exchange amount Q calculated in step S116 in the main routine shown in FIG. 4.

Next, in step S604, the laser controller 30 may calculate a raised gas pressure $\Delta$Pex (=Q/V) from the partial gas exchange amount Q.

Then, in step S606, the laser controller 30 may set an initial total gas pressure Pin directly before partial gas exchange as the total gas pressure P loaded in step S602.

Then, in step S608, the laser controller 30 may calculate a maximum total gas pressure Ph during the partial gas exchange. Specifically, the laser controller 30 may calculate the gas pressure Ph based on Ph=Pin+$\Delta$Pex. In steps S602 to S608, as shown in FIG. 12, the laser controller 30 may close all of the exhaust valve 44, the buffer gas introduction valve 52 and the halogen gas introduction valve 55.

Then, in step S610, the laser controller 30 may introduce the buffer gas and the halogen gas into the laser chamber 10 by opening the buffer gas introduction valve 52 and the halogen gas introduction valve 55. Specifically, the laser controller 30 may open the buffer gas introduction valve 52, and introduce the buffer gas (mixed gas of Ar and Ne) at a specific flow rate into the laser chamber 10 by controlling the mass flow controller (B-MFC) 51. Furthermore, the laser controller 30 may open the halogen gas introduction valve 54, and introduce the halogen gas (mixed gas of $F_2$, Ar and Ne) at a specific flow rate into the laser chamber 10 by controlling the mass flow controller ($F_2$-MFC) 54. Specifically, the laser controller 30 may introduce the gases by controls in the mass flow controller (B-MFC) 51 and the mass flow controller ($F_2$-MFC) 54. At this time, the laser controller 30 may close the exhaust valve 44.

Then, in step S612, the laser controller 30 may measure a total gas pressure P in the laser chamber 10. Specifically, the laser controller 30 may measure the total gas pressure P in the laser chamber 10 using the pressure sensor 16.

Then, in step S614, the laser controller 30 may determine whether the total gas pressure P in the laser chamber 10 measured in step S612 is smaller than the gas pressure Ph or not. When the total gas pressure P in the laser chamber 10 measured in step S612 is smaller than the gas pressure Ph, the laser controller 30 may return to step S610. On the other hand, when the total gas pressure P in the laser chamber 10 measured in step S612 is not smaller than the gas pressure Ph, the laser controller 30 may progress to step S616. In this way, in steps S610 to S614, the laser controller 30 may introduce the buffer gas and the halogen gas into the laser chamber 10 until an introduced amount of the gases becomes the partial gas exchange amount Q.

Then, in step S616, the laser controller 30 may stop the inflows of the buffer gas and the halogen gas into the laser chamber 10 by closing the buffer gas introduction valve 52 and the halogen gas introduction valve 55.

Then, in step S618, the laser controller 30 may exhaust the laser gas in the laser chamber 10 using the exhauster 42 by opening the exhaust valve 44. At this time, as shown in FIG. 12, the laser controller 30 may repeat operations of opening the exhaust valve 44 for a specific period of time and then closing for several times. Here, a pressure variation in a single opening and closing may be about 20 hPa, and a control time may be about 60 seconds.

Then, in step S620, the laser controller 30 may measure the total gas pressure P in the laser chamber 10. Specifically, the laser controller 30 may measure the total gas pressure P in the laser chamber 10 using the pressure sensor 16.

Then, in step S622, the laser controller 30 may determine whether or not the total gas pressure P in the laser chamber 10 measured in step S620 is equal to or smaller than the initial total gas pressure Pin directly before the partial gas exchange. When the total gas pressure P in the laser chamber 10 measured in step S620 is equal to or smaller than the initial total gas pressure Pin directly before the partial gas exchange, the laser controller 30 may close the exhaust valve 44, and finish the subroutine of partial gas exchange. On the other hand, when the total gas pressure P in the laser chamber 10 measured in step S620 is not equal to or smaller than the initial total gas pressure Pin directly before the partial gas exchange, the laser controller 30 may return to step S618. In this way, in steps S618 to S622, the laser controller 30 may exhaust the laser gas in the laser chamber 10 using the exhauster 42 until the total gas pressure P in the laser chamber 10 becomes the initial total gas pressure Pin directly before the partial gas exchange.

According to the control method of the laser apparatus of the disclosure, because it is possible to calculate a desired partial gas exchange amount without a large-size analyzer, desired partial gas exchange can be conducted at low cost.

3. Control Flow of Impurity Gas in Second Embodiment

Figure 13:
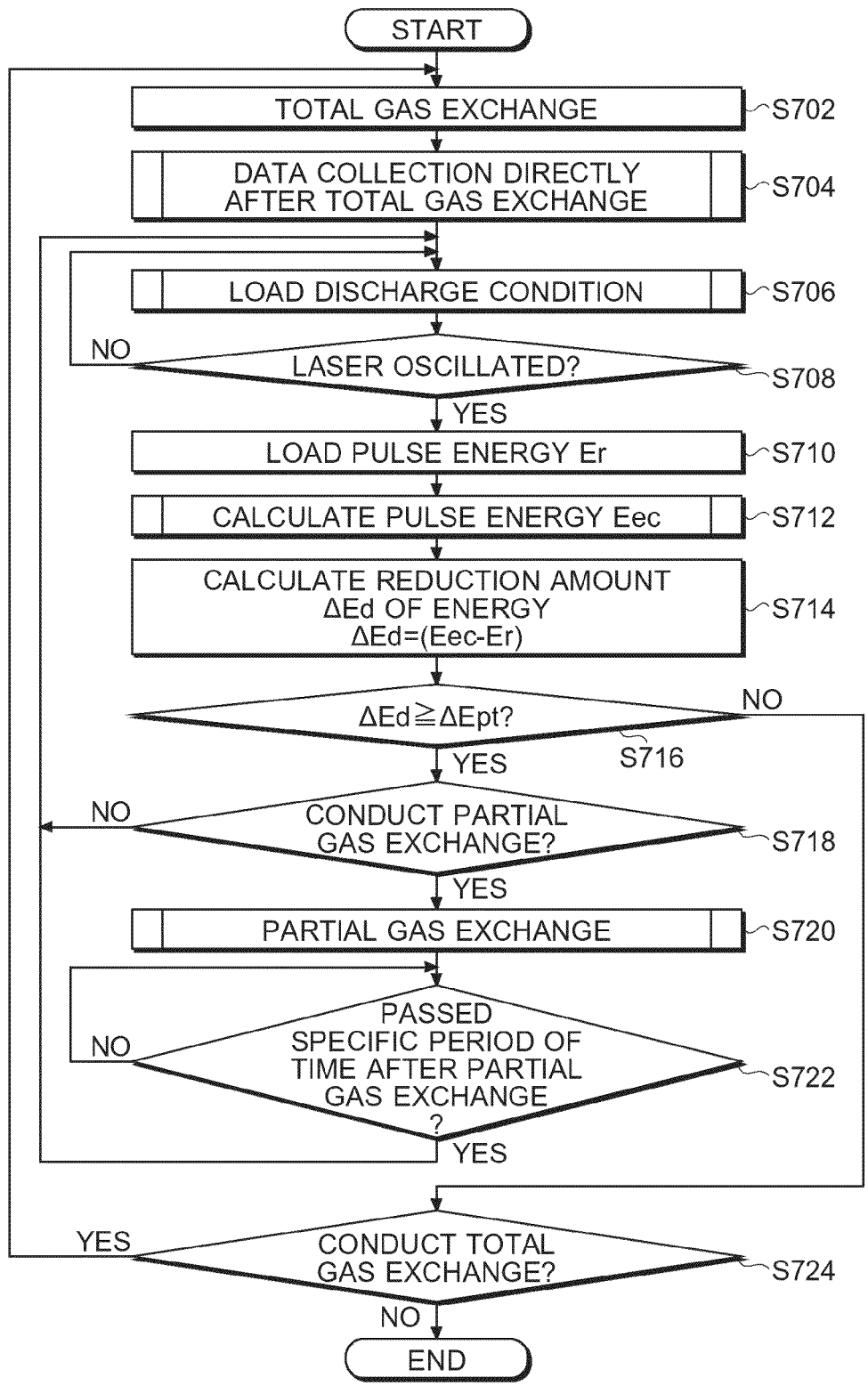
FIG. 13 is a flowchart for explaining a control method of a laser apparatus according to a second embodiment of the disclosure.

Next, as a control method of a laser apparatus according to a second embodiment, a main routine of a control flow of the impurity gas in the laser gas in the laser chamber 10 according to the second embodiment will be explained using FIG. 13. Here, based on the control flow of the impurity gas, the laser controller 30 in the laser apparatus may control each device connected thereto.

Firstly, in step S702, the laser controller 30 may conduct total gas exchange of the laser gas in the laser chamber 10.

Then, in step S704, the laser controller 30 may collect data directly after the total gas exchange. Specifically, the laser controller 30 may execute a process of a subroutine of the data collection directly after the total gas exchange shown in FIG. 5 described above.

Then, in step S706, the laser controller 30 may load discharge conditions for discharging in the laser chamber 10. Specifically, the laser controller 30 may execute a process of a subroutine of the load of the discharge conditions shown in FIG. 6 described above.

Then, in step S708, the laser controller 30 may apply a voltage between the discharge electrodes 11a and 11b based on the discharge conditions loaded in step S706, and then determine whether the laser apparatus laser-oscillates or not. When the laser apparatus laser-oscillates, the laser controller 30 may progress to step S710. On the other hand, when the laser apparatus does not laser-oscillate, the laser controller 30 may wait until the laser apparatus laser-oscillates by returning to step S706.

Then, in step S710, the laser controller 30 may load current pulse energy Er. Specifically, the laser controller 30 may load the current pulse energy Er under the discharge conditions loaded in step S706 by measuring energy of a laser beam outputted by the laser oscillation using the energy monitor unit 17, or the like.

Then, in step S712, the laser controller 30 may calculate pulse energy Eec which is supposed to be obtained directly after the total gas exchange under the discharge conditions loaded in step S706. Specifically, the laser controller 30 may execute a subroutine of calculation of the pulse energy Eec shown in FIG. 7 described above.

Then, in step S714, the laser controller 30 may calculate a reduction amount $\Delta Ed$ of energy. Specifically, the laser controller 30 may calculate the reduction amount $\Delta Ed$ (=Eec−Er) based on the current pulse energy Er loaded in step S710 and the pulse energy Eec, which is supposed to be obtained directly after total gas exchange, calculated in step S712.

Then, in step S716, the laser controller 30 may determine whether the reduction amount $\Delta Ed$ of energy is equal to or greater than an energy reduction reference $\Delta Ept$ or not. When the reduction amount $\Delta Ed$ of energy is equal to or greater than an energy reduction reference $\Delta Ept$, the laser controller 30 may progress to step S718. On the other hand, when the reduction amount $\Delta Ed$ of energy is not equal to or greater than an energy reduction reference $\Delta Ept$, the laser controller 30 may return to step S710.

In step S718, the laser controller 30 may determine whether partial gas exchange should be conducted or not. When partial gas exchange should be conducted, the laser controller 30 may progress to step S720. On the other hand, when partial gas exchange does not have to be conducted, the laser controller 30 may progress to step S724.

In step S720, the laser controller 30 may conduct partial gas exchange. Specifically, the laser controller 30 may execute the process of the subroutine of the partial gas exchange shown in FIG. 11 described above. At this time, because the partial gas exchange amount Q corresponding to the energy reduction reference $\Delta Ept$ can be pre-calculated, the laser controller 30 may conduct the partial gas exchange based on the pre-calculated partial gas exchange amount Q.

Then, in step S722, the laser controller 30 may determine whether a specific period of time has been passed after conducting the partial gas exchange or not. When the specific period of time has been passed, the laser controller 30 may progress to step S724. On the other hand, when the specific period of time is not passed, the laser controller 30 may execute step S722 again. In this case, the specific period of time may indicate a period of time until effects of partial gas exchange can be confirmed after the partial gas exchange, and preferably, it may be several minutes. During several minutes directly after partial gas exchange, for instance, laser oscillation may be unstable. Therefore, the laser controller 30 should wait until laser oscillation becomes stable and confirm the effects of the partial gas exchange thereafter.

In step S724, the laser controller 30 may determine whether total gas exchange should be conducted or not. When the total gas exchange should be conducted, the laser controller 30 may return to step S702. On the other hand, when the total gas exchange does not have to be conducted, the laser controller 30 may finish the operation of the control flow of the impurity gas in the laser gas in the laser chamber 10.

According to the control method of the laser apparatus of the disclosure, it is possible to conduct desired partial gas exchange without a large-sized analyzer at low cost at an appropriate timing depending on a reduction amount of pulse energy.

4. Control Flow of Impurity Gas in Third Embodiment

Next, a control method of a laser apparatus according to a third embodiment will be explained. The third embodiment may differ from the second embodiment in a point of adding a step of calculating the energy reduction reference $\Delta Ept$ being a reference for controlling a concentration of the impurity gas based on a temporal energy reduction amount $\Delta Ent$ due to temporal degradation of electrodes, an energy margin Em of laser, the shot number Bt of a chamber lifetime, or the like.

The laser controller 30 can calculate the energy reduction reference $\Delta Ept$ being the reference for controlling the concentration of the impurity gas based on the shot number Bt of the chamber lifetime. In order to prolong the chamber lifetime, the laser controller 30 may increase a consumption of gas by setting the energy reduction reference $\Delta Ept$ being the reference for controlling the concentration of the impurity gas small. Adversely, in order to reduce the consumption of gas, the laser controller 30 may shorten the chamber lifetime by setting the energy reduction reference $\Delta Ept$ being the reference for controlling the concentration of the impurity gas large.

Figure 14:
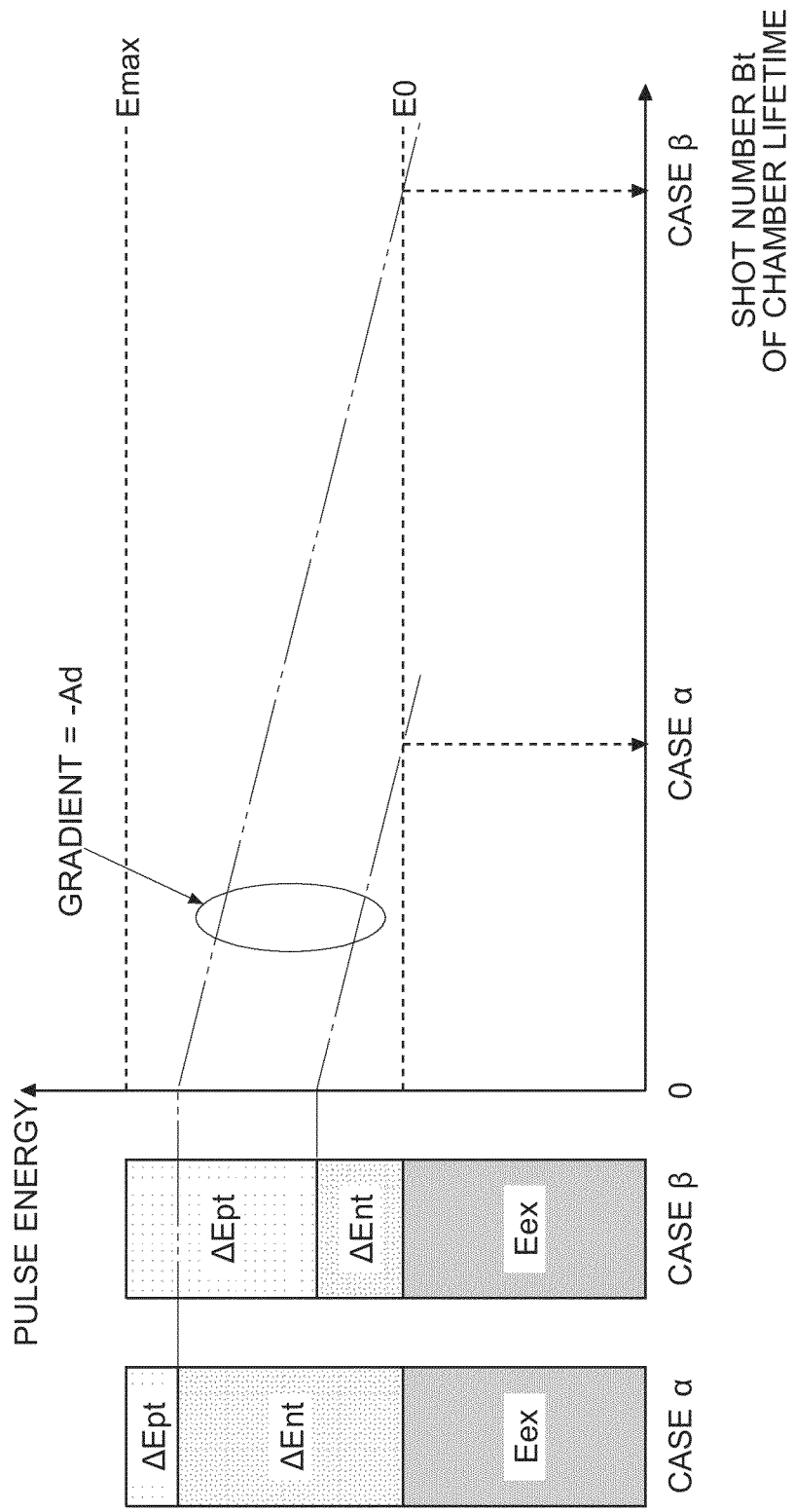
FIG. 14 is an explanatory diagram of a control method of a laser apparatus according to a third embodiment of the disclosure.

For example, as shown in FIG. 14, in a case a where the energy reduction reference $\Delta Ept$ being the reference for controlling the concentration of the impurity gas is set large, the chamber lifetime including the electrodes may be short but an integration value of the gas exchange amounts Q may decrease. On the other hand, in a case p where the energy reduction reference $\Delta Ept$ being the reference for controlling the concentration of the impurity gas is set small, the chamber lifetime including the electrodes may be long but an integration value of the gas exchange amounts Q may increase. FIG. 14 shows the relationship between the shot number Bt of the chamber lifetime and pulse energy.

Figure 15:
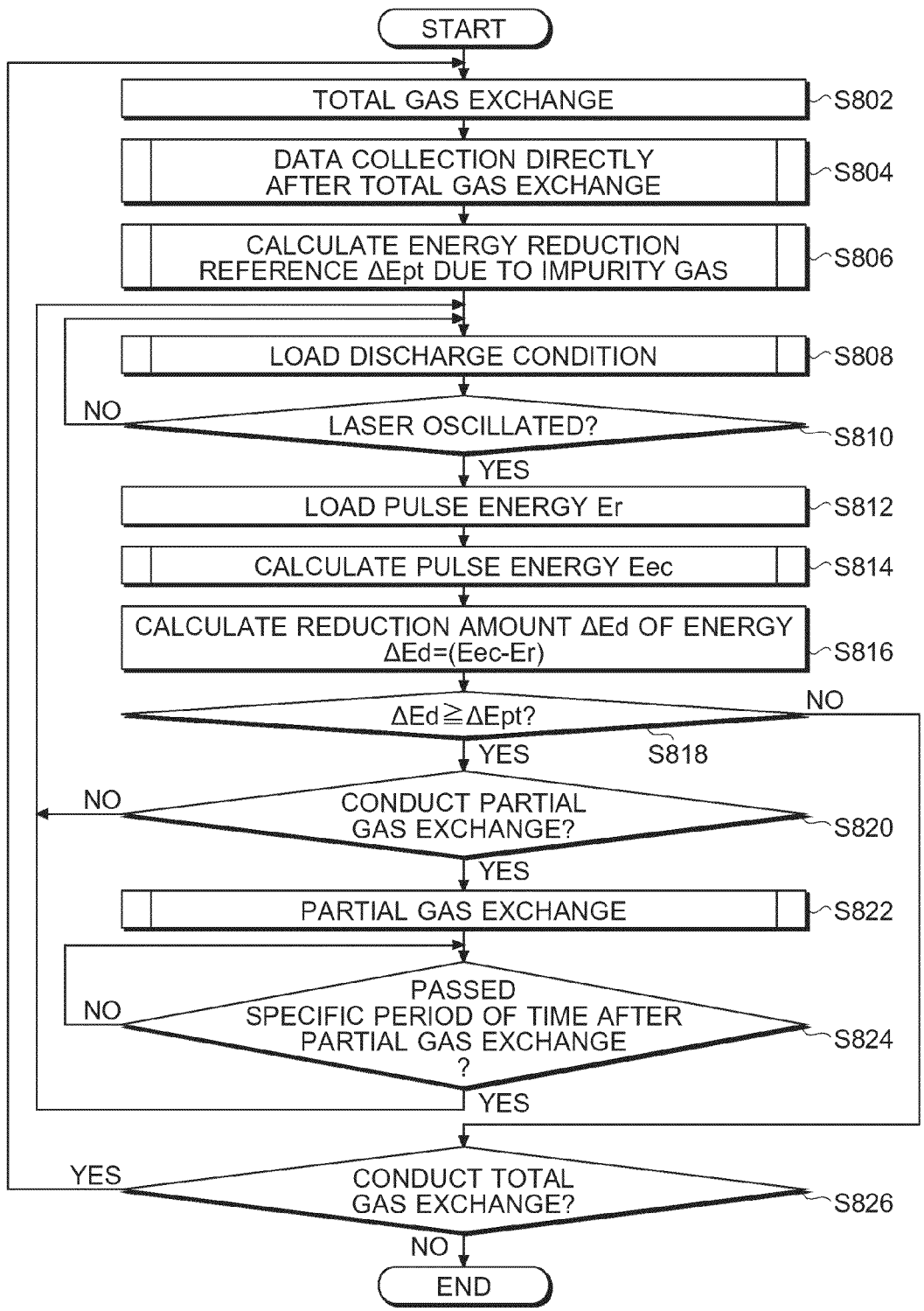
FIG. 15 is a flowchart (1) for explaining the control method of the laser apparatus according to the third embodiment of the disclosure.

Next, as a control method of a laser apparatus according to the third embodiment, a main routine of a control flow of the impurity gas in the laser gas in the laser chamber 10 will be explained using FIG. 15. Here, based on the control flow of the impurity gas, the laser controller 30 in the laser apparatus may control each device connected thereto.

Firstly, in step S802, the laser controller 30 may conduct total gas exchange of the laser gas in the laser chamber 10.

Then, in step S804, the laser controller 30 may collect data directly after the total gas exchange. Specifically, the laser controller 30 may execute a process of a subroutine of the data collection directly after the total gas exchange shown in FIG. 5 described above.

Then, in step S806, the laser controller 30 may calculate an energy reduction reference ΔEpt being the reference for controlling the concentration of the impurity gas. Specifically, the laser controller 30 may execute a subroutine for calculating the energy reduction reference ΔEpt being the reference for controlling the concentration of the impurity gas, which will be described later on.

Then, in step S808, the laser controller 30 may load discharge conditions for discharging in the laser chamber 10. Specifically, the laser controller 30 may execute a process of a subroutine of the load of the discharge conditions shown in FIG. 6 described above.

Then, in step S810, the laser controller 30 may apply a voltage between the discharge electrodes 11a and 11b based on the discharge conditions loaded in step S808, and then determine whether the laser apparatus laser-oscillates or not. When the laser apparatus laser-oscillates, the laser controller 30 may progress to step S812. On the other hand, when the laser apparatus does not laser-oscillate, the laser controller 30 may wait until the laser apparatus laser-oscillates by returning to step S808.

Then, in step S812, the laser controller 30 may load current pulse energy Er. Specifically, the laser controller 30 may load the current pulse energy Er under the discharge conditions loaded in step S808 by measuring energy of a laser beam outputted by the laser oscillation using the energy monitor unit 17, or the like.

Then, in step S814, the laser controller 30 may calculate, pulse energy Eec which is supposed to be obtained directly after the total gas exchange under the discharge conditions loaded in step S808. Specifically, the laser controller 30 may execute a subroutine of calculation of the pulse energy Eec shown in FIG. 7 described above.

Then, in step S816, the laser controller 30 may calculate a reduction amount ΔEd of energy due to the impurity gas. Specifically, the laser controller 30 may calculate the reduction amount ΔEd (=Eec−Er) based on the current pulse energy Er loaded in step S812 and the pulse energy Eec, which is supposed to be obtained directly after total gas exchange, calculated in step S814.

Then, in step S818, the laser controller 30 may determine whether the reduction amount ΔEd of energy is equal to or greater than an energy reduction reference ΔEpt or not. When the reduction amount ΔEd of energy is equal to or greater than an energy reduction reference ΔEpt, the laser controller 30 may progress to step S820. On the other hand, when the reduction amount ΔEd of energy is not equal to or greater than an energy reduction reference ΔEpt, the laser controller 30 may return to step S812.

In step S820, the laser controller 30 may determine whether partial gas exchange should be conducted or not. When partial gas exchange should be conducted, the laser controller 30 may progress to step S822. On the other hand, when partial gas exchange does not have to be conducted, the laser controller 30 may progress to step S826.

In step S822, the laser controller 30 may conduct partial gas exchange. Specifically, the laser controller 30 may execute the process of the subroutine of the partial gas exchange shown in FIG. 11 described above. At this time, because the partial gas exchange amount Q corresponding to the energy reduction reference ΔEpt can be pre-calculated, the laser controller 30 may conduct the partial gas exchange based on the pre-calculated partial gas exchange amount Q.

Then, in step S824, the laser controller 30 may determine whether a specific period of time has been passed after conducting the partial gas exchange or not. When the specific period of time has been passed, the laser controller 30 may return to step S808. On the other hand, when the specific period of time is not passed, the laser controller 30 may execute step S824 again. In this case, the specific period of time may indicate a period of time until effects of partial gas exchange can be confirmed after the partial gas exchange, and preferably, it may be several minutes. During several minutes directly after partial gas exchange, for instance, laser oscillation may be unstable. Therefore, the laser controller 30 should wait until laser oscillation becomes stable and confirm the effects of the partial gas exchange thereafter.

In step S826, the laser controller 30 may determine whether total gas exchange should be conducted or not. When the total gas exchange should be conducted, the laser controller 30 may return to step S802. On the other hand, when the total gas exchange does not have to be conducted, the laser controller 30 may finish the operation of the control flow of the impurity gas in the laser gas in the laser chamber 10.

According to the control method of the laser apparatus of the disclosure, it is possible to conduct desired partial gas exchange without a large-sized analyzer at low cost at an appropriate timing based on a reduction amount of pulse energy depending on a usage of the laser apparatus.

(Calculation of Energy Reduction Reference ΔEpt being Reference for Controlling Concentration of Impurity Gas)

Figure 16:
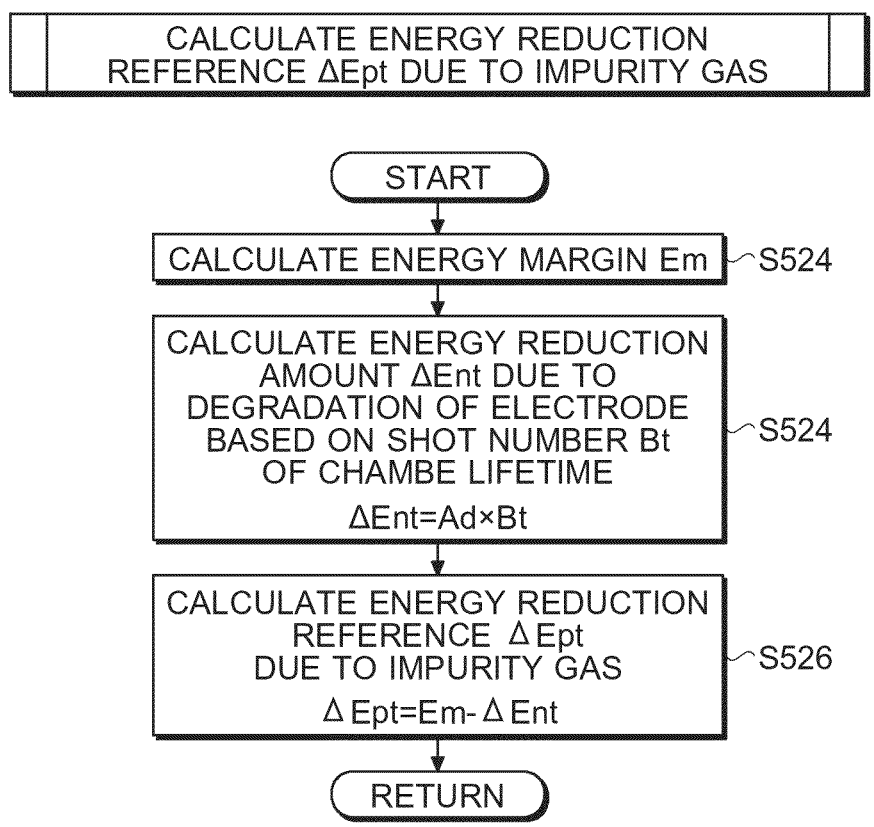
FIG. 16 is a flowchart (2) for explaining the control method of the laser apparatus according to the third embodiment of the disclosure.

Next, a subroutine of calculation of the energy reduction reference ΔEpt being the reference for controlling the concentration of the impurity gas of step S806 in the main routine according to the third embodiment will be explained using FIG. 16. Based on the subroutine of calculation of the energy reduction reference ΔEpt being the reference for controlling the concentration of the impurity gas, the laser controller 30 may control each device connected thereto.

Firstly, in step S852, the laser controller 30 may calculate an energy margin Em. Specifically, the laser controller 30 may calculate the energy margin Em using the following formula (12). The laser controller 30 may set Emax in FIG. 16 as a value of maximum pulse energy in the data collected by the subroutine of the data collection directly after the total gas exchange shown in FIG. 5, for instance. Furthermore, the laser controller 30 may set Eex in FIG. 16 as a value of maximum pulse energy instructed based on a request from the exposure apparatus.

$$Em = E\text{max} - E\text{ex} \tag{12}$$

Then, in step S854, the laser controller 30 may calculate a temporal energy reduction amount ΔEnt due to temporal degradation of the electrodes based on the shot number Bt of the chamber lifetime. Specifically, the laser controller 30 may calculate the temporal energy reduction amount ΔEnt due to temporal degradation of the electrodes using the following formula (13). Here, Ad may be an energy reduction amount per unit of shot, and it may be a value previously measured by an experiment, or the like. The shot number Bt of the chamber lifetime may be a value measured by an experiment, or may be a value assigned with consideration for a maintenance cost, a maintenance cycle, or the like.

$$\Delta Ent = Ad \times Bt \tag{13}$$

Then, in step S856, the laser controller 30 may calculate the energy reduction reference ΔEpt being the reference for controlling the concentration of the impurity gas. Specifically, the laser controller 30 may calculate the energy reduction reference ΔEpt being the reference for controlling the concentration of the impurity gas based on the energy margin Em and the temporal energy reduction amount ΔEnt due to temporal degradation of the electrodes using the following formula (14).

$$\Delta Ept = Em - \Delta Ent \qquad (14)$$

In this way, the laser controller 30 may finish the subroutine of the calculation of the energy reduction reference ΔEpt being the reference for controlling the concentration of the impurity gas. After that, the laser controller 30 may return to the main routine according to the third embodiment, and progress to step S808 in the flowchart shown in FIG. 15.

The above-described embodiments and the modifications thereof are merely examples for implementing the present disclosure, and the present disclosure is not limited thereto. Making various modifications according to the specifications or the like is within the scope of the present disclosure, and other various embodiments are possible within the scope of the present disclosure. For example, the modifications illustrated for particular embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. A method of controlling a laser apparatus comprising:
   exchanging a laser gain medium in a laser chamber configured to output a laser beam by exciting the laser gain medium;
   first measuring, after the exchanging, pulse energy of a laser beam which is oscillated in the laser chamber under a specific gas pressure and a specific charge voltage;
   calculating an approximate expression indicating a relationship between the pulse energy of the laser beam and the gas pressure in the laser chamber and the charge voltage, or a table representing a correlationship between the pulse energy, the gas pressure and the charge voltage, based on the specific pressure, the specific charge voltage and the pulse energy in the first measuring;
   storing the approximate expression or the table;
   setting a lifetime of the laser chamber;
   calculating a reference ΔEpt of an energy reduction amount based on the lifetime of the laser chamber such that the reference ΔEpt is smaller at longer lifetime of the laser chamber;
   second measuring, after the first measuring, pulse energy Er of a laser beam oscillated in the laser chamber;
   calculating pulse energy Eec which is supposed to be obtained directly after the exchanging under the gas pressure and the charge voltage in the second measuring based on the approximate expression or the table;
   calculating a reduction amount ΔEd of pulse energy based on the pulse energy Eec and the pulse energy Er using ΔEd=Eec−Er; and
   conducting, when the reduction amount ΔEd of pulse energy is equal to or greater than the reference ΔEpt, partial gas exchange of the laser gas in the laser chamber, wherein the reference ΔEpt of an energy reduction amount is calculated by ΔEpt=Em−ΔEnt,
   where Em is calculated by Em=Emax−Eex, Emax is a value of maximum pulse energy in the data collected by the first measuring, and Eex is a value of maximum pulse energy instructed based on a request from an exposure apparatus, and
   where ΔEnt is calculated by ΔEnt=Ad×Bt, Ad is an energy reduction amount per unit of the number of discharges, and Bt is the number of discharges representing the lifetime of the laser chamber.

2. The method according to claim 1, wherein the number of values of gas pressures to be set in the laser chamber for measuring the pulse energy of the laser beam in the first measuring is plural.

3. The method according to claim 1, wherein in the calculating the reduction amount ΔEd of pulse energy, the reduction amount ΔEd is calculated as a decrement ΔEn due to degradation of an electrode in the laser chamber being subtracted.

4. The method according to claim 1, wherein in the calculating the pulse energy Eec, the pulse energy Eec is calculated as a decrement ΔEn due to degradation of an electrode in the laser chamber being subtracted.

5. The method according to claim 1, wherein the number of values of charge voltages to be set for measuring the pulse energy of the laser beam in the first measuring is plural.

6. The method according to claim 1, wherein the number of values of gas pressures to be set in the laser chamber for measuring the pulse energy of the laser beam in the first measuring is plural and the number of values of charge voltages to be set for measuring the pulse energy of the laser beam in the first measuring is plural.

* * * * *